US011973839B1

(12) United States Patent
Nagpal et al.

(10) Patent No.: US 11,973,839 B1
(45) Date of Patent: Apr. 30, 2024

(54) MICROSERVICE THROTTLING BASED ON LEARNED DEMAND PREDICTIONS

(71) Applicant: Nutanix, Inc., San Jose, CA (US)

(72) Inventors: Abhinay Nagpal, Fremont, CA (US); Sujeet Mishra, Fremont, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/103,770

(22) Filed: Jan. 31, 2023

Related U.S. Application Data

(60) Provisional application No. 63/478,043, filed on Dec. 30, 2022.

(51) Int. Cl.
H04L 47/72 (2022.01)
H04L 43/08 (2022.01)
H04L 47/20 (2022.01)
H04L 67/10 (2022.01)
H04L 67/51 (2022.01)

(52) U.S. Cl.
CPC .............. H04L 67/51 (2022.05); H04L 43/08 (2013.01); H04L 47/20 (2013.01)

(58) Field of Classification Search
CPC ......... H04L 67/51; H04L 43/08; H04L 47/20; H04L 47/72; H04L 67/10
USPC ....................................................... 709/224
See application file for complete search history.

(56) References Cited

U.S. PATENT DOCUMENTS 8,549,518 B1 10/2013 Aron et al.
8,601,473 B1 12/2013 Aron et al.
8,850,130 B1 9/2014 Aron et al.
9,772,866 B1 9/2017 Aron et al.
2012/0233328 A1 9/2012 Iyoob et al.
2016/0112521 A1* 4/2016 Lawson .................. H04L 67/02
709/227
2020/0089537 A1* 3/2020 Bahirat ................... G06F 9/468
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

Primary Examiner — Jude Jean Gilles
(74) Attorney, Agent, or Firm — Vista IP Law Group, LLP

(57) ABSTRACT

A dynamically-managed microservices platform. The microservices platform is configured to selectively accept admission of microservices and to selectively throttle microservices based on a continually-trained machine learning model. The system is configured to implement multiple microservice lifecycle strategies, where individual ones of the multiple microservice lifecycle strategies use a prediction model having long-term and short term demand predictions. One or another of the multiple microservice lifecycle strategies are invoked at different times under different conditions. Under a first set of conditions, a prediction model is used to select a first strategy to admit or throttle a microservice based upon long-term or short-term demand predictions. Under a second set of conditions, the prediction model is used to select a different strategy to admit or throttle a microservice. The prediction model is continually trained such that new sets of observations and new sets of predicted outputs are codified into the machine learning model.

24 Claims, 17 Drawing Sheets

(56) References Cited

U.S. PATENT DOCUMENTS

| | | | |
|---|---|---|---|
| 2020/0120000 A1* | 4/2020 | Parthasarathy | H04L 67/10 |
| 2020/0167145 A1 | 5/2020 | Franchitti | |
| 2020/0195528 A1* | 6/2020 | Barton | H04L 47/2425 |
| 2021/0081819 A1* | 3/2021 | Polleri | H04L 51/02 |
| 2021/0081837 A1* | 3/2021 | Polleri | G06N 5/022 |
| 2021/0081848 A1* | 3/2021 | Polleri | G06F 11/3452 |
| 2021/0135983 A1* | 5/2021 | Farnham | H04L 45/70 |
| 2021/0241088 A1 | 8/2021 | Fong | |
| 2021/0258230 A1* | 8/2021 | Tormasov | H04L 41/149 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 30, 2021), from https://nutanixbible.com/ (Publication date based on indicated capture date by Archive.org; first publication date unknown).

Poitras, Steven. "The Nutanix Bible" (Sep. 9, 2022), from https://nutanixbible.com/ (Publication date based on indicated capture date by Archive.org; first publication date unknown).

Cano, I. et al., "Curator: Self-Managing Storage for Enterprise Clusters", 14th *USENIX Symposium on Networked Systems Design and Implementation, NSDI* '17, (Mar. 27, 2017).

"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.

Hagemann, P., "Evaluating dynamic load balancing of ECM workload pattern employed in cloud environments managed by a Kubernetes/Docker eco-system," Institute of Parallel and Distributed Systems, University of Stuttgart, dated Sep. 1, 2021.

Complete Specification for Invention Titled "Multi-Entity Resource, Security, and Service Management in Edge Computing Deployments," Applicant Intel Corporation, dated Dec. 18, 2020.

Zhong, Z., et al., "Machine Learning-based Orchestration of Containers: A Taxonomy and Future Directions," The Cloud Computing and Distributed Systems Laboratory, School of Computing and Information Systems, The University of Melbourne, dated Jun. 24, 2021.

Pereira da Silvaa, T., et al., "Online Machine Learning for Auto-Scaling Processing Services in the Edge Computing Environment," Pervasive and Mobile Computing, vol. 87, Dec. 2022.

Yu, J., et al., "Workflow performance prediction based on graph structure aware deep attention neural network," Journal of Industrial Information Integration 27, dated Feb. 9, 2022.

Non-Final Office Action dated Dec. 20, 2023 for U.S. Appl. No. 18/103,917.

* cited by examiner

| Item | ST | LT | Node $T_1 \triangle T_0$ | Decision |
|---|---|---|---|---|
| Entity1 (e.g., Migrate) | 10 | 1 | Decreased | Yes, enter |
| Entity2 (e.g., Cleanup) | 10 | 1 | Decreased | Yes, enter |
| Other (e.g., Map-Reduce Slaves) | 2 | 10 | Increased | Defer |
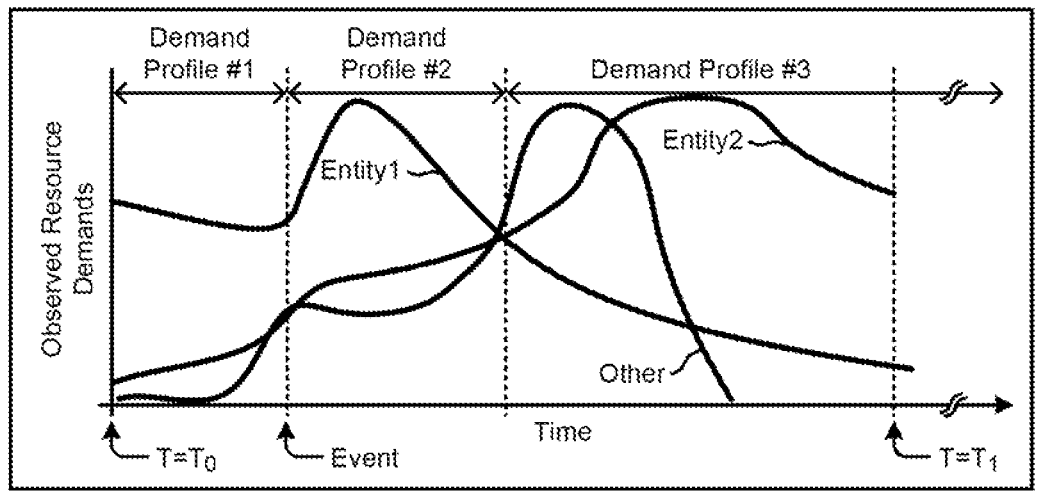
Legend
 Scale #1 $T_1 - T_0$ = 1 mSec
 Scale #2 $T_1 - T_0$ = 1 minute
 Scale #3 $T_1 - T_0$ = 1 day
FIG. 1B1

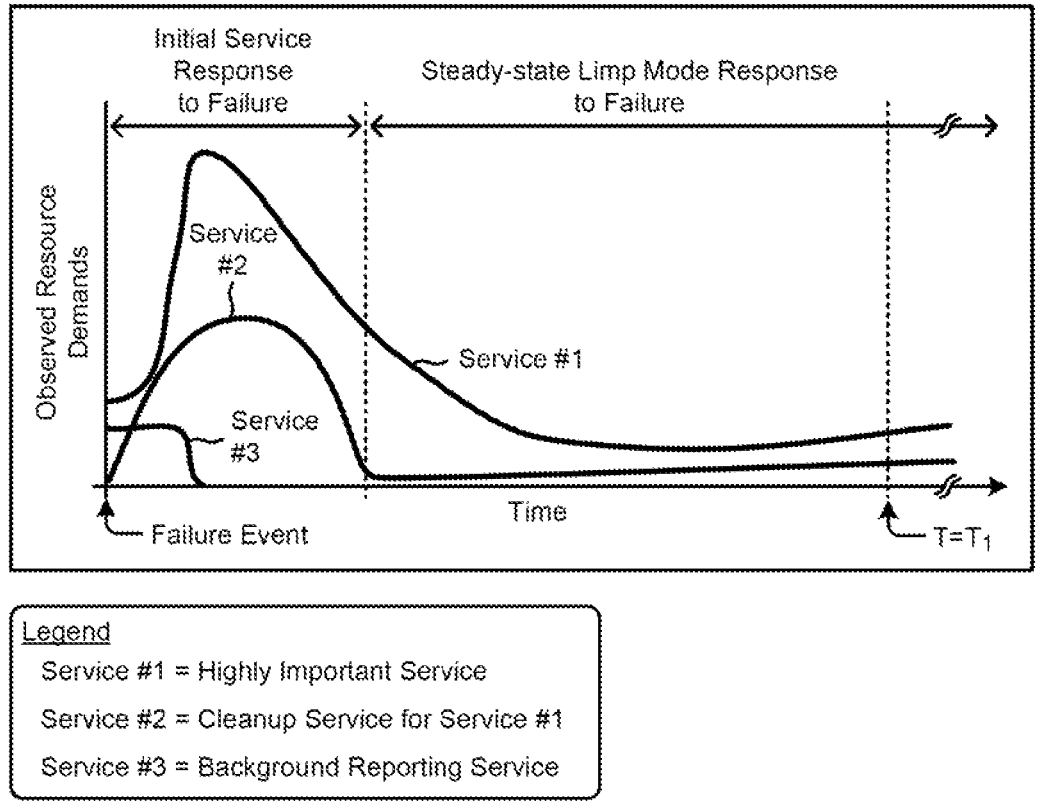
FIG. 1B2

MICROSERVICE THROTTLING BASED ON LEARNED DEMAND PREDICTIONS

RELATED APPLICATIONS

The present application claims the benefit of priority to U.S. Patent Application Ser. No. 63/478,043 titled "MANAGEMENT OF MICROSERVICES LIFECYCLES" filed on Dec. 30, 2022, which is hereby incorporated by reference in its entirety; and the present application is related to co-pending U.S. patent application Ser. No. 18/103,917 titled "MICROSERVICE ADMISSION CONTROL BASED ON LEARNED DEMAND PREDICTIONS" filed on even date herewith, which is hereby incorporated by reference in its entirety.

TECHNICAL FIELD

This disclosure relates to large scale clustered computing, and more particularly to techniques for management of a microservices platform.

BACKGROUND

Many modern computing systems, especially clustered computing systems, rely on access to so called "microservices". Deployed microservices implement a service model in which callers (e.g., computer processes, computer tasks, subroutines, etc.) request a service to be performed by accessing an entry point to invoke the service, then carrying out further communication over a protocol such as "http". Certain modern computing deployments implement virtualization systems whereby the foregoing callers are virtual machines. Such virtual machines have the property of being so well defined such that they can be created and destroyed and/or moved from place to place (e.g., from node to node) very flexibly.

Historically, microservices are dealt with in one of two ways: (1) a given microservice is pre-loaded and readied for a potential future call by a virtual machine, or (2) a given microservice is merely tagged for deferred loading—deferred until after the occurrence of an actual call by a virtual machine or other caller. In the former case, the expense of pre-loading and readiness of a microservice for a potential future call might be incurred even though no such call is ever made. This "eager" loading has the unwanted effect of incurring expense without any benefit. In the latter case, the calling virtual machine would have to wait for the microservice to be loaded and readied. This "lazy" loading of a microservices has the unwanted effect of incurring a start-up latency before the virtual machine can continue.

Unfortunately, considering the fact that virtual machines are created and destroyed very rapidly, the situation arises where neither eager loading nor lazy loading is an appropriate strategy for provisioning microservices. Moreover, considering the fact that microservices themselves are created and destroyed very rapidly further complicates the situation where neither eager loading nor lazy loading is an appropriate strategy for provisioning microservices. What is needed is a way or ways to overcome the foregoing deficiencies. More specifically, what is needed is a technique or techniques that address the problems associated managing microservices over the entirety of their lifecycles.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for management of microservices lifecycles, which techniques advance the relevant technologies to address technological issues with legacy approaches. More specifically, the present disclosure describes techniques used in systems, methods, and in computer program products for continuously trained microservices lifecycle predictive models in a multi-node computing environment. Certain embodiments are directed to technological solutions for handling long-term demand predictions independently from short-term demand predictions and vice versa.

The disclosed embodiments modify and improve over legacy approaches. In particular, the herein-disclosed techniques provide technical solutions that address the technical problems attendant to having too few or erroneous predictions about a microservice's future. Such technical solutions involve specific implementations (e.g., data organization, data communication paths, module-to-module interrelationships, etc.) that relate to the software arts for improving computer functionality. Various applications of the herein-disclosed improvements in computer functionality serve to reduce demand for computer memory, reduce demand for computer processing power, reduce network bandwidth usage, and reduce demand for intercomponent communication.

For example, when performing computer operations that address the various technical problems underlying having too few or erroneous predictions about a microservice's future, both memory usage and CPU cycles demanded are significantly reduced as compared to the memory usage and CPU cycles that would be needed but for practice of the herein-disclosed techniques.

The ordered combination of steps of the embodiments serve in the context of practical applications that perform steps for handling long-term demand predictions independently from short-term demand predictions and vice versa. As such, techniques for handling long-term demand predictions independently from short-term demand predictions and vice versa overcome long-standing yet heretofore unsolved technological problems associated with having too few or erroneous predictions about a microservice's future that arise in the realm of computer systems.

Many of the herein-disclosed embodiments for handling long-term demand predictions independently from short-term demand predictions and vice versa are technological solutions pertaining to technological problems that arise in the hardware and software arts that underlie large scale clustered computing. Aspects of the present disclosure achieve performance and other improvements in peripheral technical fields including, but not limited to, hyperconverged computing platform management and distributed computing systems.

Some embodiments include a sequence of instructions that are stored on a non-transitory computer readable medium. Such a sequence of instructions, when stored in memory and executed by one or more processors, causes the one or more processors to perform a set of acts for handling long-term demand predictions independently from short-term demand predictions and vice versa.

Some embodiments include the aforementioned sequence of instructions that are stored in a memory, which memory is interfaced to one or more processors such that the one or more processors can execute the sequence of instructions to cause the one or more processors to implement acts for handling long-term demand predictions independently from short-term demand predictions and vice versa.

In various embodiments, any combinations of any of the above can be organized to perform any variation of acts for continuously trained microservices lifecycle predictive models in a multi-node computing environment, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1B1 and FIG. 1B2 exemplify time-based demand profiles as used when continuously training a microservices lifecycle predictive model in a multi-node computing environment, according to some embodiments.

FIG. 2 illustrates a microservices lifecycle management system that makes and uses a continuously trained microservices lifecycle predictive model, according to some embodiments.

DETAILED DESCRIPTION

Figure 1A:
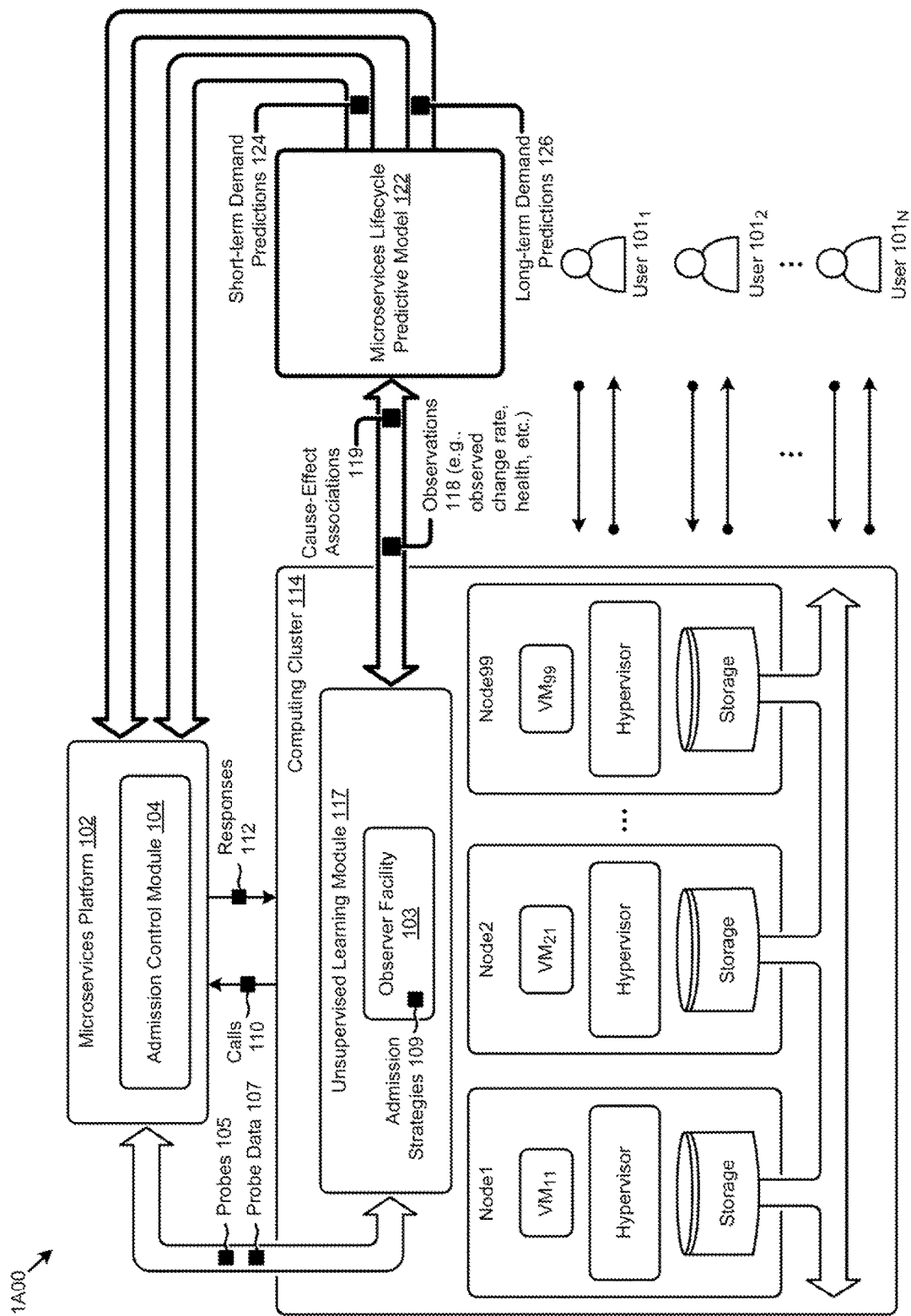
FIG. 1A exemplifies an environment in which embodiments a microservices admission control module can be implemented.

Aspects of the present disclosure solve problems associated with using computer systems for having too few or erroneous forecasts about a microservice's future. These problems are unique to, and may have been created by, various computer-implemented methods that have none, or too few, or in some cases, too many or erroneous forecasts about a microservice's future in the context of large-scale clustered computing. Some embodiments are directed to approaches for handling long-term demand forecasts independently from short-term demand forecasts and vice versa. The accompanying figures and discussions herein present example environments, systems, methods, and computer program products that implement continuously trained microservices lifecycle predictive models in a multi-node computing environment.

Overview

The deployment of microservices in a clustered computing setting often introduces contention for a cluster's computing resources, thus putting "pressure" on the system as a whole. That is, the acts of deployment of microservices might demand computing resources that are in excess of computing resources that are available at that time, thus causing contention for the finite availability of computing resources.

Some attempts to manage such contention have included customer-driven rules or requirements (e.g., administrator-established rules) such as "keep instantaneous resource demand to under 80% of the available computing resource supply." Unfortunately, such customer-driven rules or requirements may or may not be accurate or even rational with respect to the actual functioning of the cluster. In some cases, customer-driven rules or requirements may be based on erroneous assignment of importance to any one or more of the customer-driven rules or requirements, which in turn results in assigning erroneous importance to operations underlying management of the microservices.

Inaccurate rules or heuristics and/or erroneous assignments of importance values often leads to suboptimal ongoing management of the microservices. For example, when comporting with the so-called "eager" heuristic, the acts of early loading of a microservice implies or assumes that the microservices of the system will be needed some time later, and as such, all of the microservices are proactively loaded. This has the unwanted effect of consuming computing resources—in some cases very significant amounts of computing resources—even though there is no guarantee that any particular microservice will ever be invoked. On the other hand, when comporting with the so-called "lazy" heuristic for loading of a microservice, rather than proactively loading microservices, instead the heuristic waits until a particular microservice is invoked. While this "lazy" heuristic avoids wasting computing resources, it has the unwanted effect of introducing potentially long waiting periods while the demanded microservice is being loaded on behalf of the invoker.

System administrators have attempted (but failed) to address the aforementioned unwanted effects by implementing still further approaches. In a first category of approaches, an administrator configures an overseer module that is manually configured such that the deployment of cluster-wide services comports with whatever environmental parameters the administrator believes to be present at the time of deployment, or with whatever environmental parameters the administrator believes representative of near-term future deployments. In a second category of approaches, the administrator might overprovision resources so as to be relatively certain that no user or application will experience unavailability or unexpectedly slow behaviors. In a third category of approaches, the administrator might describe a set of heuristics that govern creation and destruction of service instances.

All of the foregoing categories of approaches are deficient with respect to ongoing management of multi-node computer clusters. Specifically referring to the aforementioned first category of approaches, the administrator's settings tend to be representative of some perceived then-current metrics—which often are (or become) wildly wrong due to the stochastic behaviors of multi-node computing clusters. In the second category of approaches, while overprovisioning may address fluctuations within a wide range of stochastic behaviors, it has the downside of requiring capital equipment expenditures, often incurring non-negligible dollar costs for deploying capital equipment that is never or infrequently used, which in turn brings down the efficiency of the capital expended. With respect to the third category of approaches, it turns out that pre-established sets of heuristics that govern the lifecycle (e.g., creation and destruction) of service capacity are only useful during certain periods during the lifecycle. Moreover, techniques within this third category of approaches involving pre-established sets of heuristics are often intrinsically unlinked from ongoing operations of the computing cluster. That is, there are no reliable mechanisms by which the administrator can know that the heuristics are out of date or otherwise no longer applicable or effective, or even if the out-of-date heuristic is remediable in a timeframe of relevance.

For example, even if an implementation alerts the administrator when a heuristic or heuristics become out of date (e.g., with respect to the then-current behavior of the computing cluster), or even if it is automatically determined by any means that a heuristic is no longer effective, by the time the administrator is alerted, the computing cluster has already moved into undesirable behaviors that impact the users or applications. Still further, there are many situations where changing conditions of the computing cluster are happening so frequently that it is impractical for the administrator to modify the configurations and/or any underlying heuristics.

Deficiencies of Heuristically-Assigned Importance and Statically-Assigned Importance Some inputs that are dominant in assigning a notion of importance to the operations are relatively static in nature. For example, an on-prem installation might have 200 computing clusters assigned to "production" tasks and another 200 computing clusters assigned to "development and test" tasks. Another example of a relatively static input pertains to alerts. Certain "Critical Alerts" should be deemed to be more important (and therefore scheduled at a higher priority) than "Informational Alerts". The nature of such statically-assigned importance designations fails to consider the dynamic nature of a modern computing cluster.

Another way to address assigning a notion of importance to some particular operation is to characterize the importance of the intended result of the operation. However in a computing system, it is not always possible to know a priori what a future result will be. In fact in some cases (e.g., when an API call or service request is opaque to an observer) it might not even be possible to estimate what the future result will be, much less where the result lies on a scale of importance.

An administrator might designate certain services as highly important or urgent services, and might designate other services as background services. This scheme might work when it is always true that highly important services are indeed high priority services, and when it is always true that background services are always suitably handled as low priority services. In modern computing clusters, however, it is extremely frequent that what is normally deemed to be a routine background service or task might become a critical service or task in certain situations that this disclosure seeks to address. For example, a garbage collection task might be deemed to be a routine background task, however, when the computing cluster is at risk of running out of available storage space, the formerly routine, low priority task now becomes extremely important—possibly critical—at least in that the result of the garbage collection might include reclamation of storage space that can now become newly available, thus ameliorating the risk of running out of available storage space.

The Need for Dynamism in Assigning Importance

As can now be seen, what is needed is a prioritization scheme or model that is itself dynamic. When the functioning of the prioritization scheme is itself dynamic, then any overseer module that governs admission of services can be informed by the dynamically-changing prioritization scheme. In turn, admission decisions can be informed by the dynamically-changing priorities.

The Need for Dynamism Based on Actual In-Situ Scenarios

With respect to dynamically-changing priorities, consider a situation where a computing cluster is at risk of running out of available storage. In that case, upcoming operations on that computing cluster should be prioritized in the expectation that the upcoming operations would serve to ameliorate the risk (e.g., by adding a computing cluster component that can serve additional available storage, or by migrating processes away from the computing cluster that is at risk, etc.). A system that can predict a performance outcome based on then-current conditions of the computing cluster can avail of a machine learning (ML) model that is trained over time in actual in situ scenarios. Over time, the ML model can become more precise and accurate with respect to its predictions. Such an ML model can implement or derive from unsupervised learning wherein outcomes are labeled automatically based on machine-based analysis of actual occurrences.

It should be noted that there may be many outcomes from a particular set of stimulus signals and/or input conditions (e.g., the computing cluster state) that are applied to the ML model. In fact, there may be a time-ordered series of short-term outcomes and long-term outcomes, any/all of which can be automatically labeled with respect to a time series. Strictly as one example, consider a computing cluster that is under resource pressure. Launching a task to expand the computing cluster (e.g., add a computing node) to the computing cluster might, in the short term, consume scarce computing resources to provision the additional node into the computing cluster and to migrate VMs from overcommitted nodes to the newly provisioned node (e.g., load re-balancing). However, in the longer term, the newly-augmented computing cluster might not experience resource pressure for a long time, like weeks, months, even years. An unsupervised microservices lifecycle predictive model can automatically label short-term outcomes and long-term outcomes based on a given set of inputs. Moreover, such a microservices lifecycle predictive model can be configured to respond to an application of a particular set of stimulus signals by outputting both a short-term demand prediction and a long-term demand prediction, based on one single application of the stimulus signals to the microservices lifecycle predictive model.

As used herein, a microservices lifecycle predictive model is a set of input signals and corresponding set of output signals that have been collected and labeled using supervised or unsupervised machine learning. A microservices lifecycle predictive model comprises inputs and corresponding output that have been collected over a time period that spans from initial admission of a microservice through the timeframe of execution of the microservice and through the timeframe of at least one of, throttling (e.g., throttling down), quiescing, or purging of the microservice. The input signals may comprise any measurements taken over any time period and over or pertaining to any entity (e.g., virtual machine) or configuration, or operation (e.g., service) of any virtualization system.

Operations of a Virtualization System Implemented on a Multi-Node Computing Cluster The following operations can be implemented in or by a virtualization system:
1. Deploy an ML model to predict the short-term behavior and long-term behavior of individual virtual machines (VMs) based on VM sizing information, characterization of the VMs with respect to a VM's intended purpose or application (e.g., such as virtual desktop VMs, database server VMs, report generator VMs, etc.) and other observable behaviors.
2. Then, combining those predictions with other knowledge (e.g., IOP S demand history, storage allocation/usage history, etc.) to come up with a future health or status or demand prediction for each VM.
3. The time-series of predictions for all VMs are analyzed for cause and effect. In scenarios where a VM is deemed to be the cause of a release or diminution of resource contention, then that VM can be automatically labeled or otherwise designated as such, and the ML model will thereafter prioritize VMs with that label or designation.

When following the foregoing procedure, it might turn out that VMs that carry out pressure-relieving operations have an initial, relatively high short-term demand followed by a long-term demand that is much lower. To illustrate, consider the time-variant computing demands for expanding a computing cluster (e.g., adding a node). An initial demand for computing resources would be needed to expand a computing cluster (e.g., add a node and perform migrations), whereas in the longer term, the expansion might result in availability of additional resources. As such, services that carry out operations such as adding resources and/or alert signaling would be prioritized higher with respect to other services. Legacy approaches might wrongly characterize a computing cluster-expanding service as a resource hog since, at least upon the service's initial invocation, the service is indeed a resource hog. When this sort of wrong characterization happens, the very service that could relieve pressure on the computing cluster is the service that is disallowed or deferred, or even shut down, leading to highly non-optimal solutions.

To further explain, it often happens that a resource hog process is only transiently a resource hog. Consider the case where a new microservice (e.g., a containerized microservice) is booted-up. In an early phase of operation after being invoked, the microservice will acquire its constituent components (e.g., operating system modules and/or Java "Beans"). Sometimes these constituent components are large, and/or sometime these constituent components are many in number such that in this early phase of operation the microservice demands huge amounts of resources. However, in a following timeframe, the microservice might only parsimoniously demand resources, or even none at all, at least until such time as a request or call is made to the microservice. Thus, one way to avoid increasing resource pressure on the computing cluster is to delay invocation of the initial demand-incurring bring-up routine until some later time when the computing cluster as a whole is not under resource contention (e.g., later in the day, after 5 pm, after 9 pm, etc.), or until such time as a request or call is made to the microservice.

To explain further, many servlet container and/or gateway/microservices engine implementations offer the option to load objects into memory on demand ("lazily") or to load objects upfront ("eagerly"). Lazily loading objects helps in optimizing startup time and memory consumption at the cost of a slight performance hit as the objects would only be initialized and loaded into memory in response to an actual request. This choice or option to load either lazily or eagerly is a naive approach. What would be better is to predict if/when there will be an actual request. What would be still even better would be to predict not only the timeframe to load, but also to know the computing demand that would be placed on the system with respect to available computing resources. For example, it might be that many hundreds of microservices can be loaded eagerly because they do not present a significant resource demand (in the short-term) to load. This approach needs some sort of predictor. Moreover it needs such a predictor to be able to distinguish short-term predicted demands (e.g., for loading the microservice) from long-term demands (e.g., for ongoing operation of the microservice). This information can be advantageously exploited to facilitate high-performance operation of a computing cluster.

For example, if we know that availability of a particular microservice corresponds to a cluster-critical function, then that microservice would more likely be admitted eagerly in the short-term so as to avoid a later demand when there might be some critical event to be handled on the computing cluster. In some situations a long-term demand prediction might refer to a timeframe many hours into the future. It could even be weeks or months (or years) into the future to account for certain seasonal effects like national holidays that happen perhaps only once a year.

As used herein, a microservice is executable code that is invokable by accessing a web endpoint. Microservice arguments can be passed to a particular microservice using a uniform resource locator string that contains an indication of a protocol (e.g., "http:") as well as any arguments that are accessed by the microservice. A microservice can be invoked by a virtual machine or by an executable container, or by any other embodiment of an executable entity. Microservice results can be communicated back to a invoking entity using any available communication protocol. A microservice may exhibit a first particular resource demand in an initial period of execution, and a second particular resource demand in a later period of execution. In certain cases, an initial period of execution exhibits a high demand for computing resources (e.g., during an initial short-term startup phase), whereas, in a later period of execution, the microservice exhibits a low demand for computing resources. In some other cases, an initial period of execution exhibits a low demand for computing resources, whereas, in a later period of execution, the microservice exhibits a high demand for computing resources (e.g., during an ongoing, long-term computation phase).

As can now be seen, a microservices lifecycle predictive model can be used as a predicting engine such that any VM or microservice can be characterized with respect to both its short-term demand profile as well as its long-term demand profile. Having such a microservices lifecycle predictive model leads to correct decision-making—and avoiding making wrong decisions (e.g., wrongly admitting the microservice, or wrongly throttling the microservice), where such decisions are based on wrong heuristics and/or where such decisions are based on a paucity of dynamically-observed computing cluster component behaviors.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments, even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies an environment in which embodiments a microservices admission control module can be implemented. As an option, one or more variations of environment 1A00 or any aspect thereof may be implemented in the context of the architecture and functionality of the embodiments described herein and/or in any environment.

The figure is being presented to illustrate how multiple components of a computing system can be interconnected so as to implement unsupervised learning. More particularly, the figure is being presented to illustrate how multiple components of a computing system can be interconnected so as to train a microservices lifecycle predictive model that is in turn used for ongoing microservice admission control, ongoing microservice quiescence, ongoing quality of service (QOS) management, and/or other ongoing or dynamic functions of a microservices platform.

As shown, the figure depicts a computing cluster 114 that is in communication with microservices platform 102. The microservices platform responds to requests or commands (e.g., via calls 110) for the microservices platform to carry out some operation. As one example, the microservices platform might respond to a request for the microservices platform to load up a particular microservice. Such a request can be satisfied by any module of, or associated with, the microservices platform. In the specific embodiment of FIG. 1A, the facility that loads up a particular microservice can be carried out by the shown admission control module 104 of the microservices platform.

As used herein, a microservices platform is a repository for partitions of executable code (e.g., modules, executable containers, subroutines, etc.) that can be invoked by accessing a web endpoint. A microservices platform offers access to a plurality of web endpoints that can implement respective services and/or controls pertaining to such services. A microservices platform can accept probes that in turn report out probe measurements to one or more consumers of probe data. As used herein, a microservices platform includes or is integrated with an admission control facility and a contention control facility. A microservices platform can respond to throttling commands pertaining to particular microservices.

As shown, the microservices platform responds to requests or commands by providing responses 112 back to the caller. As shown, a call to the microservices platform might originate from any component of the computing cluster. In some situations, a virtual machine (e.g., virtual machine $VM_{11}$, virtual machine $VM_{21}$, . . . , virtual machine $VM_{99}$) running on a computing node (e.g., node1, node2, . . . , node99) might raise a call to the microservices platform. In other situations, an observer or learning module (e.g., observer facility 103 or unsupervised learning module 117) might raise an admission request call to the microservices platform. In addition to the calls 110 and responses 112 by and between constituent components of the computing cluster, the learning module might deploy probes 105 to the microservices platform. Such probes are software or firmware routines that are configured to observe events and/or behaviors of components of the microservices platform. Further, probes can be configured to return probe data 107 to a caller. Probe data can be emitted by the microservices platform synchronously or asynchronously, and such probe data 107 can be ingested by an observer facility 103 of the unsupervised learning module 117.

In the particular partitioning shown, the unsupervised learning module, either by itself, or in conjunction with the observer facility has the potential to capture (e.g., by saving into node-local storage) any/all observations that can be taken during the lifetime of the computing cluster and/or the lifetime of the microservices platform. Furthermore, in the particular partitioning shown, the unsupervised learning module, either by itself or in conjunction with an observer facility, may include multiple admission strategies 109 (e.g., code and/or data that implements logic for admitting a particular microservice into the microservices platform). Strictly as an example, an admission strategy can be configured to admit a particular microservice eagerly (e.g., in advance of a request for access to the particular microservice), or another admission strategy can be configured to admit a particular microservice lazily by scheduling future acts (e.g., by waiting until receipt of a request for access to the particular microservice). As such, rather than naively relying on a global admission strategy under all conditions, one or another of the admission strategies can be selected based on any of, a set of then-current conditions, or historical conditions, or predicted conditions in the computing cluster.

As such, any/all observations (e.g., observed changes in VMs, observed changes in health of any component, etc.) taken over any time period can be used as inputs to microservices lifecycle predictive model 122. Moreover, since collection of observations is taken over a relatively long time period, the microservices lifecycle predictive model can be configured to output both short-term as well as long-term demand predictions. In some cases, an instance of an unsupervised learning module is able to provide cause-effect associations 119 to the microservices lifecycle predictive model. For example, a launch of a VM at time=T0 might be followed by an observation that that particular VM is demanding significant CPU resources during the period time=T1 to time=T2 (e.g., short-term observation), and that that particular VM ceases demanding significant CPU resources during the period time=T3 to time=T4 (a long-term observation). Many other contemporaneous observations might also be delivered to (e.g., stored in) the microservices lifecycle predictive model such that at some future time when the same or similar conditions occur, then the microservices lifecycle predictive model can emit short-term demand predictions 124 and long-term demand predictions 126.

Observations 118 can be represented as a set of points that form a curve or curves, and the curve or curves can be demarked with respect to time. Any time-based demarcation (e.g., time=Tx to time=Ty) can be analyzed with respect to computing resource demands (e.g., CPU demands, network services demands, storage facilities demands, etc.) corresponding to the observations. Moreover, such analysis includes analyzing computing resource demands with respect to an available supply computing resources.

The time-based demarcations might correspond to granular time scale (e.g., covering milliseconds) or might correspond to a coarse time scale (e.g., covering a day or days or even a season). The nature of observations and how often an observation is recorded might be related to the time scale. For example, IOPS might be observed and recorded at a high sampling rate (e.g., taking one sample per second), whereas user behavior might be observed less frequently (e.g., only a few times over the course of an 8 hour workday). Accordingly, it can happen that a long-term demand prediction refers to a timeframe many hours, or week, or months, or years into the future.

Any portion of any curve in any time scale can be characterized with respect to observed resource demands over a time period, and such characterizations can become inputs to a microservices lifecycle predictive model. Moreover, any portion of any curve in any time scale can be characterized with respect to predicted resource demands over a time period, and such predictions can be used in codifying short-term and long-term resource demands of an entity (e.g., a microservice) over its lifecycle. A microservices lifecycle predictive model can be configured to output short-term demand predictions concurrent with long-term demand predictions, as shown.

FIG. 1B1 exemplifies a first set of time-based demand profiles as used when continuously training a microservices lifecycle predictive model in a multi-node computing environment. As an option, one or more variations of the first set of time-based demand profiles or any aspect thereof may be implemented in the context of the architecture and functionality of the embodiments described herein and/or in any environment.

In this example, the computing entity shown as entity "entity1" has a demand profile that starts in a relatively high computing resource regime (e.g., corresponding to demand profile #1), then move to an even higher demand regime (e.g., corresponding to demand profile #2) before tailing off into a much lower demand regime (e.g., corresponding to demand profile #3). From this, one can see that the short-term demand (e.g., corresponding to the time period of demand profile #1 through the time period of demand profile #2) is much higher than that entity's long-term demand (e.g., corresponding to demand profile #3). This information can be used (e.g., by a microservices admission control module) to make decisions as to when to admit a particular microservice.

For example, a fairly large number of microservices that have a demand profile similar to entity "entity1" can be confidently loaded into the microservices platform based on the prediction that those microservices will quickly move into a low demand regime. On the other hand, even though microservices that have a demand profile similar to entity "entity2" have an initially low demand for resources, it is known or at least predictable that a large number of microservices with a demand profile similar to entity "entity2" should not be admitted into the microservices platform—at least not until the microservices platform is resized/reconfigured to handle the long-term demand. By following this regime, the loading of subsequent microservices into the multi-node computing system can be governed such that the subsequent loading activities do not exceed a given instantaneous demand threshold. This can be contrasted with a naive approach where microservices that are known to have an initial high demand for computing resources are not admitted—in spite of the fact that admitting such a microservice would have the long-term effect of alleviating contention in the computing cluster.

Further, combinations of short-term and long-term demand profiles can be used to inform the order of loading of microservices. More specifically an observer (e.g., observer facility 103 of FIG. 1) can provide sufficient event and condition data to the aforementioned microservices lifecycle predictive model such that the order of loading can be arranged so as to not exceed any instantaneous demand threshold. For example, a large number of short-term and long-term demand curves can be overlayed. In the event that there is any instantaneous time at which the aggregate short-term demand predictions exceeds a given threshold, then the start time of some of the microservices can be skewed so as to avoid any moment when the aggregate short-term demand predictions exceed the given threshold. Similarly, in the event that there is any instantaneous time at which the aggregate long-term demand predictions exceed a given threshold, then either (1) the start time of some of the microservices can be skewed so as to avoid any moment when the aggregate long-term demand predictions exceed the given threshold, and/or (2) the microservices platform is reconfigured to accommodate at least some of the aggregate long-term demand predictions.

Figure 2:
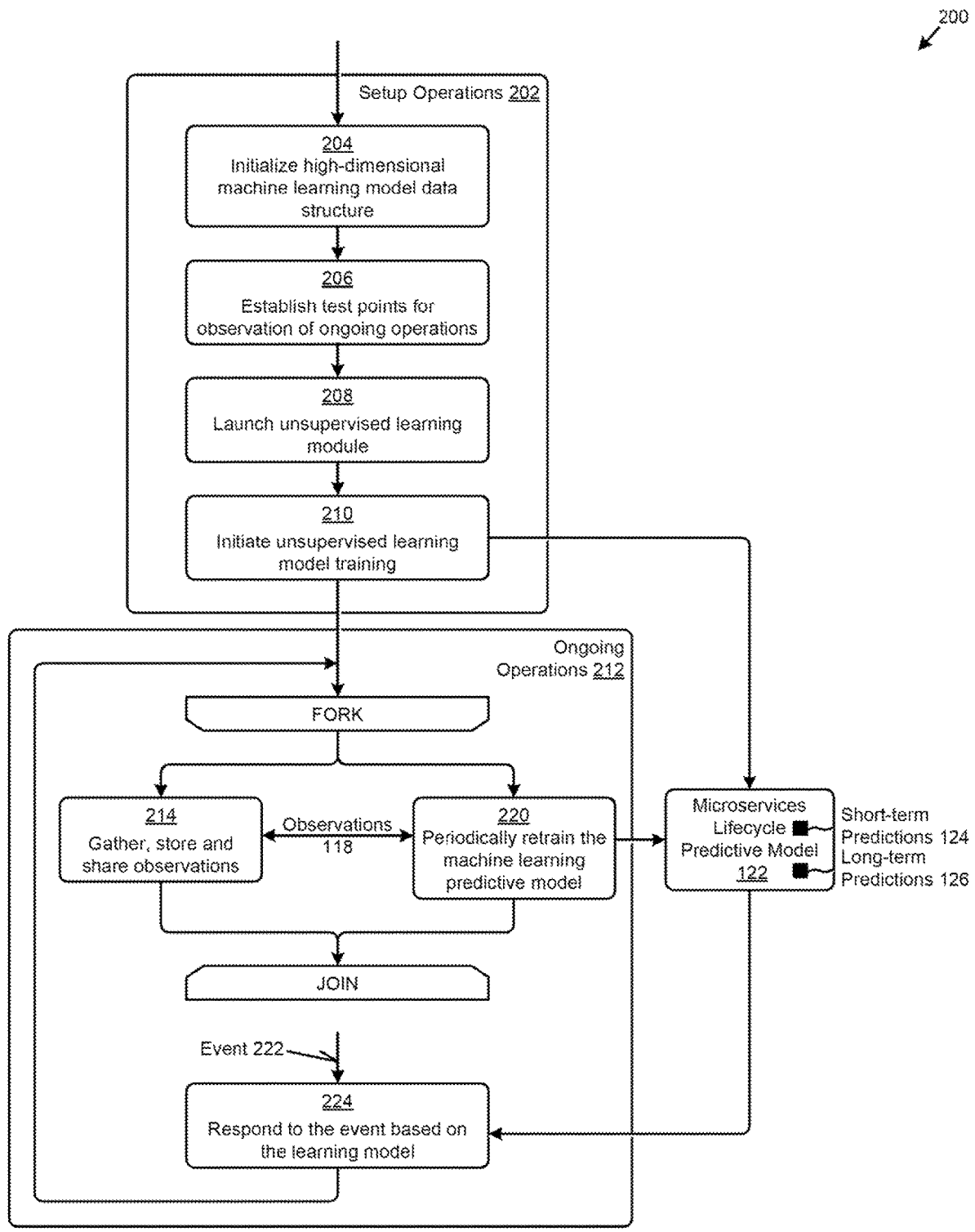

FIG. 1B2 depicts an alternative set of time-based demand profiles. These are presented to show how certain services (e.g., service #1, service #2, service #3) can be related to other services (e.g., how service #2 is related to service #1). Moreover, these time-based demand profiles are presented to illustrate how certain services and/or their respective signals or behaviors can be a priori labeled as (1) higher priority (e.g., service #1,) or as (2) lower priority (e.g., service #2, and service #3). In some cases, certain services and/or their respective signals or behaviors can be associated with a "high priority" label or "critical" label based on outputs of an unsupervised learning module.

An observer can label input signals (e.g., resource demands) or observed events (e.g., state transitions) from a service based on a priori designations. These designations can be used to weight input signals or observed events. As one particular example involving state transitions, an observer (e.g., observer facility 103 of FIG. 1) can detect and capture entry into and exit from one or more wait states (e.g., when loading modules identified in a dependency chain). In some cases there are hundreds of dependency chains, with new dependency chains being frequently created and old dependency chains being frequently destroyed, thus demanding dynamic retraining of the microservices lifecycle predictive model. To accommodate the foregoing as well as many other situations, the microservices lifecycle predictive model can be trained with a large number of signals.

Further, in some cases, the microservices lifecycle predictive model can operate on priorities that are input into the predictive mode as labeled signals. For example, certain VMs or services can be deemed a priori to correspond to a higher priority or, alternatively, a lower priority. Presented below is an illustrative set of VMs or services for which signals or events originating from such VMs or services are deemed to be correlated to higher priorities (e.g., higher numeric weights).

Examples of Higher Priorities

Following are examples of higher priority VMs, services, or signals:
1. Identity and authentication success events and/or failure events.
2. API Gateway events (e.g., occurrences of multiple concurrently pending requests, exceptions from too many concurrent requests, etc.).
3. Database service events.
4. Critical alert occurrences.
5. Network access success events and/or failure events.
6. Login service success events and/or failure events.
7. Time of day services.
8. Forecasted aggregate computing cluster demand services.
9. Previously observed event histories (e.g., throttling occurrences, breaches of predetermined rate limits, etc.).

Examples of Lower Priorities

Following are examples of lower priority VMs, services, or events:
1. Reporting events and/or report delivery failure events.
2. Garbage collection success/completion events and/or suspension or failure events.
3. Logging subsystem success/completion events and/or reported log entry failure events.
4. History tracking (e.g., which microservices were admitted and in what order).
5. Shutdown or quiescence tracking (e.g., which microservices had been shut down, and in what order).
6. Scheduling tracking (e.g., which microservices were subjected to a later scheduled invocation).

Any of the foregoing can be captured into a microservices lifecycle predictive model, and such a microservices lifecycle predictive model can be trained iteratively on a continuous basis.

Short-Term Vs. Long-Term Observations

In some implementations, capturing user behaviors (e.g., deriving from user $101_1$, user $101_2$, ..., user $101_N$, etc.) serves to predict not only what a user or module might do 'next' (e.g., in a certain first timeframe to follow) but also what the user or module might not do in a certain timeframe to follow. As examples, a particular user might log into his or her virtual desktop (VDI) and immediately begin interacting with the virtual desktop. In contrast, a particular user might log into his or her database administration virtual machine (thus incurring a short-term demand) but then not begin interacting with the database administration virtual machine until later in the day (thus incurring a later, possibly long-term demand). Such information about a user's behaviors can inform proactive processing so as to prepare the user's environment in correspondence with learned user behaviors. For example, if the user regularly opens up a large file during VDI interactions, then a proactive process can be defined to fetch that large file even in advance of that user opening that file in that session.

As another example, demand pressure can be relieved by gracefully de-prioritizing VMs that are resource 'hogs'. A resource hog can be automatically identified by the microservices lifecycle predictive model in that the time series of a resource hog VM always stays the same or increases over time. De-prioritizing resource hog VMs allows the system as a whole to function better. In some cases, de-prioritizing a resource hog VM entails temporarily reducing the number of service ports that are open to the resource hog VM. Additionally or alternatively, a resource hog VM can be restricted based on other factors such as knowledge of a minimum service rate and/or knowledge of what kind of operations are being done by the resource hog.

FIG. 2 illustrates a microservices lifecycle management system that makes and uses a continuously trained microservices lifecycle predictive model. As an option, one or more variations of microservices lifecycle management system 200 or any aspect thereof may be implemented in the context of the architecture and functionality of the embodiments described herein and/or in any environment.

The figure is being presented to illustrate how a microservices lifecycle predictive model can be initialized, and how such a microservices lifecycle predictive model can be continuously trained.

As shown, the figure depicts a set of setup operations 202 as well as a set of ongoing operations 212. The setup operations serve for initializing a microservices lifecycle predictive model, whereas the ongoing operations serve the dual function of (1) continuous training of the microservices lifecycle predictive model, and (2) using the microservices lifecycle predictive model when responding to events within the computing cluster.

In this particular embodiment the microservices lifecycle predictive model is composed of a large number of observation vectors that are stored in a high-dimensional data structure that is initialized (step 204) so as to prepare the high-dimensional data structure for ongoing supervised, semi-supervised, and/or unsupervised training. Step 206 serves to establish test points for observation of ongoing operations. Such ongoing observations may be directed to changing signals, and/or changing priority designations, and/or occurrence of events, and/or entry into or exit from any one or more computing states.

Having both (1) an initialized model data structure as well as (2) a number of observations points (e.g., the probes of FIG. 1A), an unsupervised learning module can be launched (step 208). The unsupervised learning module in turn initiates unsupervised training of the learning model (step 210).

Now, having an initially-populated microservices lifecycle predictive model, use of that model can commence (step 224) upon any type of event 222. Meanwhile, the microservices lifecycle predictive model can be subjected to continuous training/re-training. This is shown by the steps within the fork-join block. Specifically, the operations underlying step 214 serves to continually store observations of virtual machines and other entities, all the while in ongoing communications with the operations underlying step 220, which is configured to periodically retrain the microservices lifecycle predictive model 122. As shown, the microservices lifecycle predictive model includes both short-term demand predictions 124 and long-term demand predictions 126.

As used herein, the phrase short-term demand predictions refers to a first set of values output by a microservices lifecycle predictive model when the model is stimulated with a first set of conditions, and as used herein, the phrase long-term demand predictions refers to a second set of values output by a microservices lifecycle predictive model when the model is stimulated with the same first set of conditions, wherein the first set of values were captured at a time earlier than the second set of values.

As can now be understood, a microservices lifecycle predictive model that includes both short-term demand predictions 124 and long-term demand predictions 126 can be trained using any manner of observations 118 that are pertinent to the behavior of the system under observation. One possible embodiment involves applying the foregoing techniques to train a microservices lifecycle predictive model. Such a microservices lifecycle predictive model can be consulted at various moments during the operational lifecycle of a microservices platform. By observing the predictions, it is possible to avoid choking points, which in turn avoids overprovisioning of the microservices platform.

Figure 3:
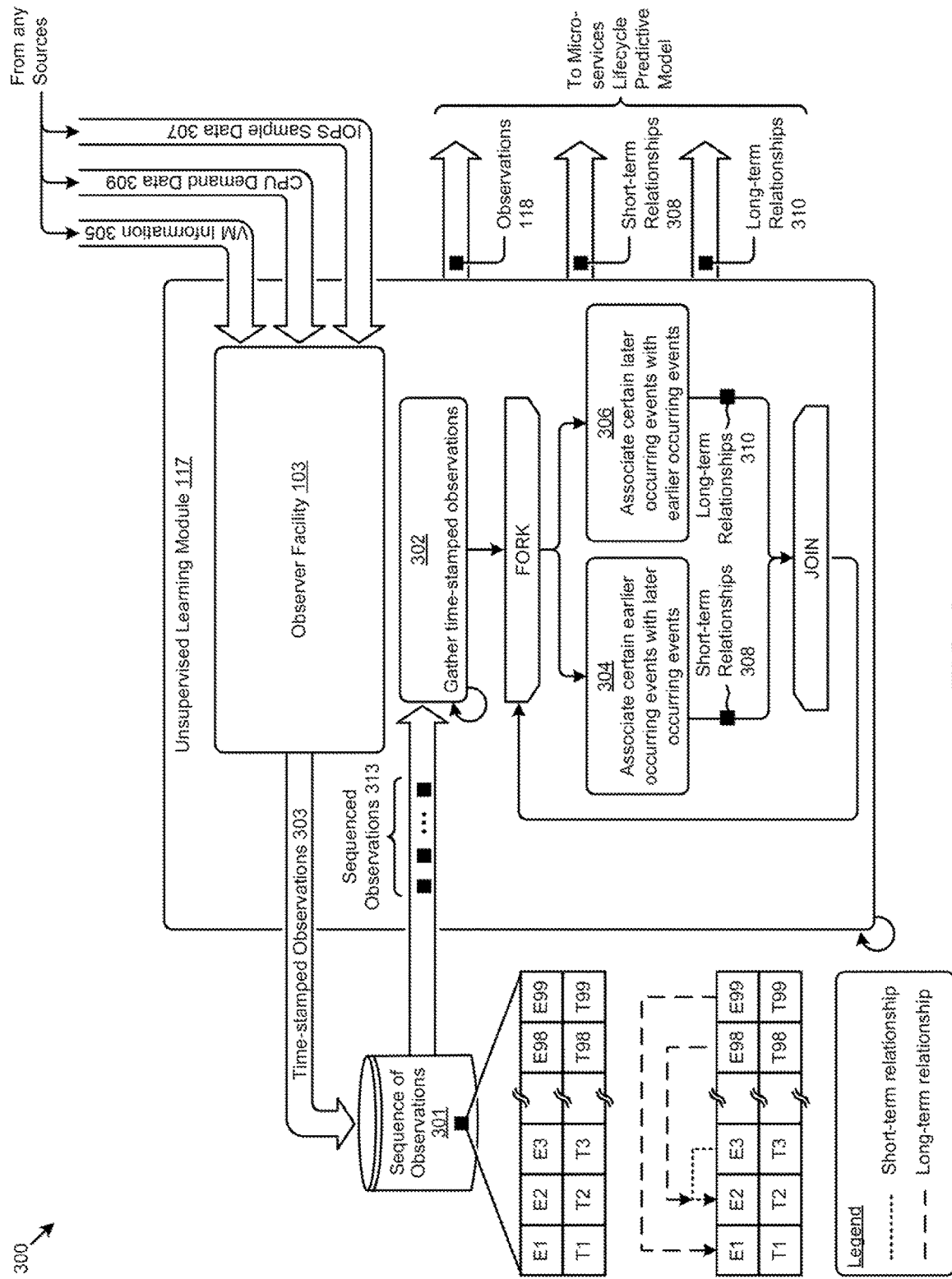
FIG. 3 exemplifies an unsupervised learning system as used for continuously training a microservices lifecycle predictive model as used by a microservices platform in a multi-node computing environment, according to some embodiments.

FIG. 3 exemplifies an unsupervised learning system as used for continuously training a microservices lifecycle predictive model as used by a microservices platform in a multi-node computing environment. As an option, one or more variations of unsupervised learning system 300 or any aspect thereof may be implemented in the context of the architecture and functionality of the embodiments described herein and/or in any environment.

The figure is being presented to illustrate how an unsupervised learning module can be configured to provide a continuous stream of signals used for continuous unsupervised training of a microservices lifecycle predictive model.

As shown, the unsupervised learning module 117 includes an observer facility 103, which observer facility receives a panoply of inputs from any source or sources of the multi-node computing environment. Strictly as examples, such inputs may include virtual machine information 305, input/output (IOPS) sample data 307, CPU demand data 309, network services demands, and storage facilities demands, among other observed data. The observer facility gathers the foregoing inputs, timestamps the inputs to generate timestamped observations 303, and stores them as a sequence of observations 301. The sequence of observations 301 can be accessed (for example) by specifying a range of sequenced observations 313, which sequenced observations 313 can be ingested by any caller. Any known technique can be used to identify patterns derived from the sequenced observations. Further the time range of any identified patterns may be of any duration (e.g., milliseconds, seconds, minutes, hours, weeks, months, years, etc.).

Strictly as one example, if a bully VM is identified on a computing cluster (i.e. a VM with anomalously high CPU, and/or anomalously high memory usage, and/or anomalously high network or other I/O (input/output or IO) usage) it often leads to unwanted effects (e.g., resource contention, network drops, etc.) that affect other VMs in the computing cluster. This is one example of a situation that can be remediated.

As another example, if a VM has been compromised by ransomware, in the short term, certain atypical IO patterns in the sequenced observations emerge, while in the longer term, the sequenced observations might correspond to so called lateral movement, where the malware accesses the network with the intent to spread itself by attempting to connect to various ports of VMs in the network. Such sequenced observations, both in the short term and in the longer term, can be characterized. One way to capture a sufficiently long sequence of observations is to continuously loop while collecting observations.

This particular embodiment includes two continuously looping operations. In a first set of looping operations 302 are carried out to continuously gather timestamped observations, which are in turn provided to a second set of looping operations. As shown, the second set of looping operations implements a fork-join block in which fork-join block operations 304 are carried out to associate earlier occurring events with later occurring event, and in which fork-join block operations 306 are carried out to associate later occurring events with earlier occurring events. In this manner semantics of correlation, and possibly semantics of causation, are captured in short-term relationships 308 and long-term relationships 310.

In this and similar embodiments the short-term relationships 308 and long-term relationships 310 are conveyed in data structures that include and/or refer to timestamps on or of observations 118 (e.g., timestamps on events, timestamps on measurements, etc.) and the source or sources from which the relationships between observations are derived. This degree of data capture facilitates ongoing synchronous and/or asynchronous analysis of cause and effect as well as other correlations. High-fidelity correspondence between events (e.g., event E1, event E2, event E3, . . . , event E98, event E99, etc.) and time of capture (e.g., time T1, time T2, time T3, . . . , time T98, time T99, etc.) facilitates identification of relationships (e.g., event E98 was caused by event E2). The time scale used in the course of identification of relationships can be any time scale (e.g., spanning milliseconds, or spanning seconds, or spanning days or even seasons). High-confidence correspondence between events across various short and long time intervals then facilitates ongoing microservices lifecycle management. One aspect of ongoing microservices lifecycle management involves admission control.

As used herein, admission control refers to the active management of when a particular microservice or series of microservices is brought to a state of readiness (e.g., readiness for a virtual machine to take advantage of the particular service microservice or series of microservices. One objective to meet when bringing a microservice or series of microservices to a state of readiness is to bring up all requested/needed microservices quickly, yet without bringing the microservices to a choke point. This can be accomplished in many ways, one of such ways is to schedule bring-up of a set of microservices in a manner that does not swamp the microservices platform. One use of high precision predictions of a microservices lifecycle predictive model is to schedule a bring-up sequence in a manner such that (1) short-term demands stay under a choke point threshold and, (2) long-term or steady state demand also stays under a choke point threshold.

Figure 4A:
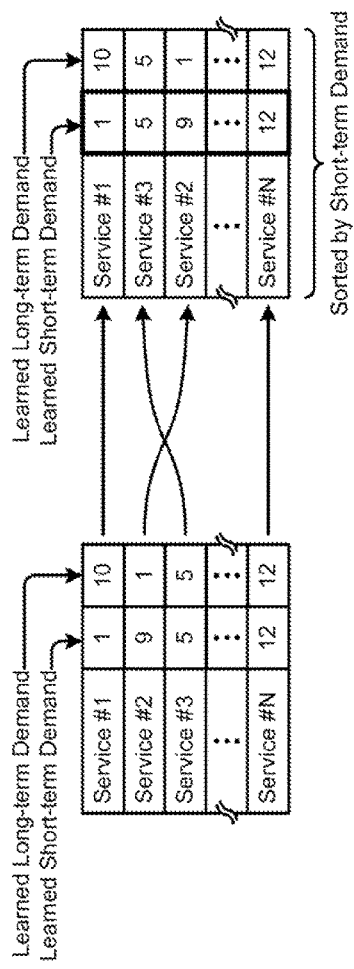
FIG. 4A exemplifies a first microservices admission control technique as used by a microservices admission control module, according to some embodiments.
Figure 4B:
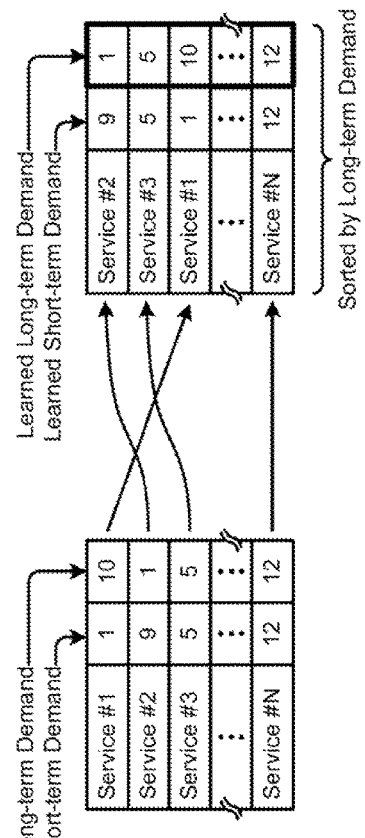
FIG. 4B exemplifies a second microservices admission control technique as used by a microservices admission control module, according to some embodiments.

One possible technique for scheduling bring-up of a set of microservices in a microservices platform is shown and described as pertains to FIG. 4A and FIG. 4B.

FIG. 4A exemplifies a first microservices admission control technique as used by a microservices admission control module. As an option, one or more variations of first microservices admission control technique 4A00 or any aspect thereof may be implemented in the context of the architecture and functionality of the embodiments described herein and/or in any environment.

The technique of FIG. 4A uses a sorting technique where a table of microservices (e.g., service #1, service #2, service #3, etc.) are sorted into ascending order such that the services are ordered by increasing learned short-term demand. Using such a sort, it is possible to admit microservices into the microservices platform in a controlled manner where aggregate then-current short-term demands do not exceed a choke point threshold for the microservices platform. It happens that sometimes the intent of this technique is not always achieved. This can happen when one microservice is dependent on prior bring-up of another microservice, and as such the learned short-term demand might be highly situational-based merely on what prior (possibly non-optimal) admission control order was used. Over time, learned admission control will approach an optimal schedule. Moreover, over time, learned admission control will learn an admission rate that satisfies a particular QOS for the computing cluster as a whole. Accordingly, the rate of admissions, as well as whether or not a particular admission is performed eagerly or not, can be controlled so as to ensure that new admissions do not demand more resources that would be needed to comport with the particular quality of service for the computing cluster as a whole.

In addition to the sorting technique of FIG. 4A, another approach is to sort a table of microservices sorted into ascending order such that the services are ordered by increasing learned, long-term demand. This is shown in the diagram of FIG. 4B.

FIG. 4B exemplifies a second microservices admission control technique as used by a microservices admission control module. As an option, one or more variations of second microservices admission control technique 4B00 or any aspect thereof may be implemented in the context of the architecture and functionality of the embodiments described herein and/or in any environment.

The technique of FIG. 4B uses a sorting technique where a table of microservices (e.g., service #1, service #2, service #3, etc.) are sorted into ascending order such that the services are ordered by increasing learned, long-term demand. Using such a sort, it is possible to admit microservices into the microservices platform in a controlled manner where aggregate long-term demands do not exceed a choke point threshold for the microservices platform. Additionally or alternatively, using such a sort, it is possible to admit microservices into the microservices platform in a controlled manner where aggregate long-term demands satisfy a quality of service requirement for the microservices platform.

In comparing the technique of FIG. 4A that observes short-term constraints with the technique of FIG. 4B that observes long-term constraints, it emerges that it is highly desirable that both (1) short-term constraints as well as (2) long-term constraints be concurrently honored. This can be accomplished by purposely introducing admission skew into the schedule.

To explain, consider the numeric example shown in Table 1. The table is sorted into ascending order such that the services are ordered by increasing learned, short-term demand. If the shown entities (e.g., microservice MS1, microservice MS2, entity E1, and entity E2) are admitted as shown, then the admission would observe the threshold constraint in the short term. That is, even if all of the short-term demands are in fact concurrently demanded during admission, the total demand of 27 units does not breach the choke point threshold of 27. However, in the long term, this schedule would demand 28 units, which would breach the choke point threshold of 27. A better way is to control microservice admission such that both (1) short-term constraints as well as (2) long-term constraints are concurrently honored. This can be accomplished by introducing a time-wise scheduling skew into the microservices bring-up schedule. A numeric example is shown in Table 2.

TABLE 1

| Entity | Short-term Demand Value (e.g., T0-T1) | Long-term Demand Value (e.g., T2-T3) |
| --- | --- | --- |
| MS1 | 1 | 10 |
| MS2 | 5 | 5 |
| E1 | 9 | 1 |
| E2 | 12 | 12 |
| Total | 27 | 28 |
| Threshold | 27 | 27 |
| Violation? | NO | YES |

To explain how to control microservice admission such that both (1) short-term constraints as well as (2) long-term constraints be concurrently honored, consider the numeric example shown in Table 2. Table 2 is the same as Table 1 except that microservice MS1 is delayed until some slightly later time. In doing so, the short-term demands that are concurrently demanded during admission (a total demand of 26 units) does not breach the constraint (i.e., the choke point threshold of 27). Thus, by introducing a small amount of skew into the microservices admissions scheduling the microservices platform does not breach its choke point.

TABLE 2

| Entity | Timeframe = T0 to T1 | Timeframe = T2 to T3 | Future Demand Prediction |
|---|---|---|---|
| MS1 | -delay to T2- | 1 | 10 |
| MS2 | 5 | 5 | ? |
| E1 | 9 | 1 | ? |
| E2 | 12 | 12 | ? |
| Total | 26 | 19 | ? |
| Threshold | 27 | 27 | 27 |
| Violation? | NO | NO | ? |

The techniques of FIG. 4A and FIG. 4B, can be further improved by considering dependencies between microservices. A technique that considers dependencies between microservices in combination with learned short-term demand and learned long-term demand is shown and described as pertains to FIG. 5A.

Figure 5A:
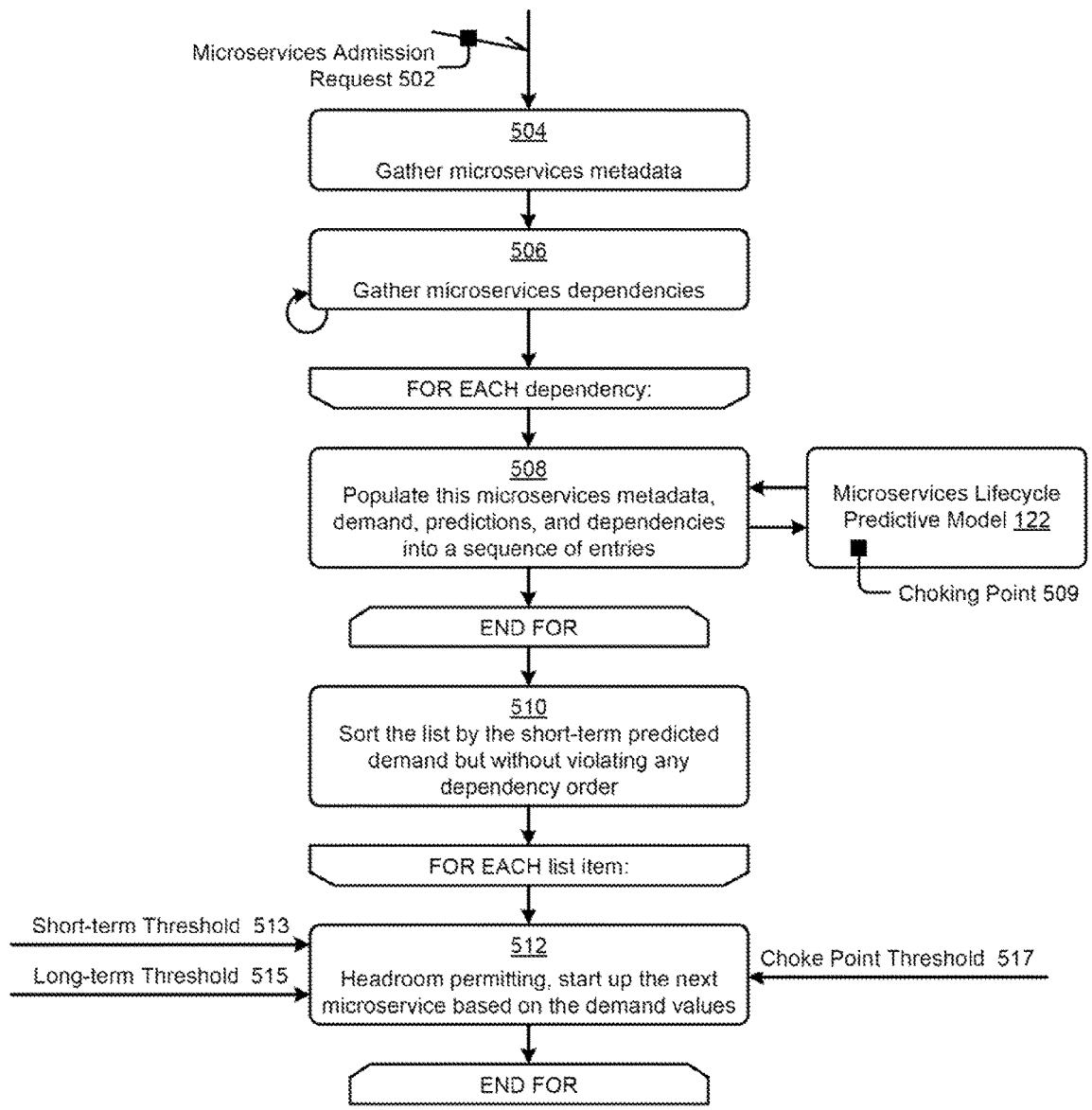
FIG. 5A depicts a microservices admission control system based on a continuously trained microservices lifecycle predictive model, according to some embodiments.

FIG. 5A depicts a microservices admission control system based on a continuously trained microservices lifecycle predictive model. As an option, one or more variations of microservices admission control system 5A00 or any aspect thereof may be implemented in the context of the architecture and functionality of the embodiments described herein and/or in any environment.

The figure is being presented to illustrate how microservices dependencies can be considered when forming a microservices bring-up schedule. More specifically, the disclosed technique relies on a combination of microservice dependencies in combination with learned demands.

As used herein, the term dependency model or the term dependency graph refers to a computer-readable representation of how microservices call each other. For example, if microservice 'A' includes code that calls microservice then microservice 'A' depends on the existence and callability of microservice A particular microservice may include microservice metadata that indicates which other microservices are at least potentially callable by the particular microservice.

The shown flow starts upon receipt of a microservices admission request 502. Step 504 serves to gather microservice metadata which in turn is sufficient to gather dependencies (step 506). It can happen that one microservice depends on availability of services of another microservice and that microservice depends on yet another microservice, and so on. Accordingly step 506 serves to traverse a tree of dependencies until all dependencies corresponding to the microservices admission request are known. Then, for each dependency, an initial dependency-aware admission control list is formed (step 508). Observing the order on this initial dependency-aware admission control list might eliminate wait states, and in turn might reduce total bring-up time for the full set of interdependent microservices, however such a bring-up schedule might breach short-term thresholds. Accordingly, an improved schedule involves use of a microservices lifecycle predictive model 122 so as to avoid breaching the choking point 509 during microservices bring-up.

It should be noted that a particular microservice might have many dependencies on other microservices, none of which other microservices are dependent on each other. Consider an independent microservice 'A', an independent microservice and an independent microservice 'C', all of which do not depend on each other, and all of which are needed by microservice 'P'. In this scenario, independent microservice 'A', independent microservice 'B', and independent microservice 'C' can be scheduled in any order that does not breach the choking point 509 during bring-up. Accordingly, the foregoing initial dependency-aware admission control list is re-sorted by a learned short-term demand, yet without violating any dependency order (step 510). Then, in a FOREACH loop, each entry in the re-sorted list is considered in turn for bring-up. So long as there is sufficient then-current resource headroom available (step 512), each microservice is brought up based on the learned, short-term demand for that microservice. As such, breaching either the short-term threshold 513 or the long-term threshold 515 is avoided. Some embodiments include a quantitative value for a choke point threshold 517, which can be used to inform microservices throttling decisions.

Figure 5B:
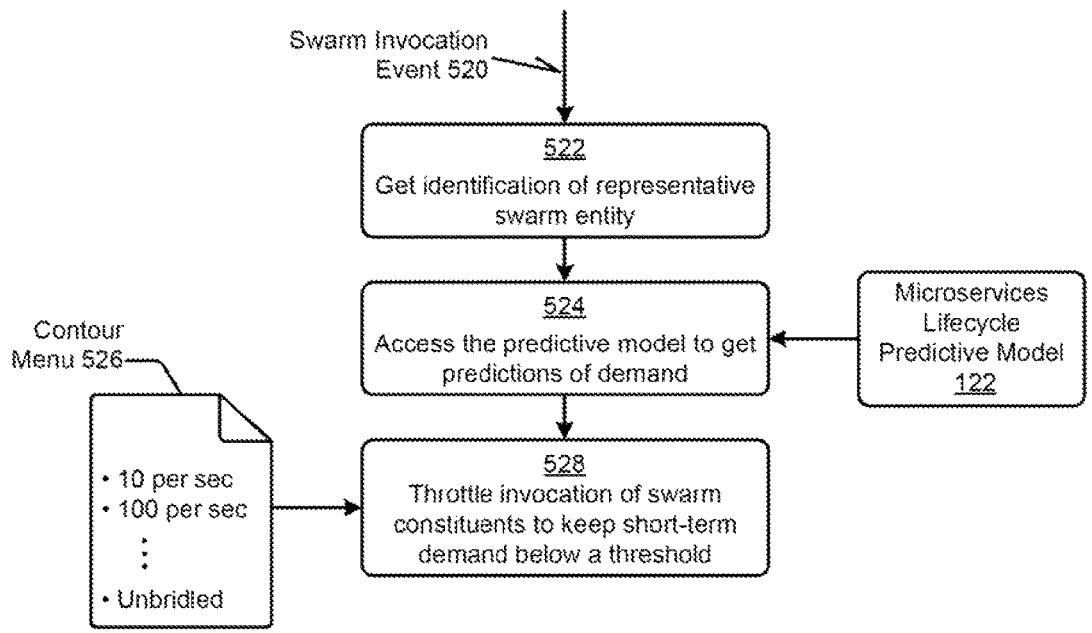
FIG. 5B depicts a virtual machine admission control system based on a continuously trained microservices lifecycle predictive model, according to some embodiments.

FIG. 5B depicts a virtual machine admission control system based on a continuously trained microservices lifecycle predictive model. As an option, one or more variations of virtual machine admission control system 5B00 or any aspect thereof may be implemented in the context of the architecture and functionality of the embodiments described herein and/or in any environment.

In some situations, a microservice, either during bring-up or based on an invocation/request from a virtual machine or other entity might need to instantiate a swarm of services. Consider a swarm of VDIs or a swarm of slave entities that are part of a map-reduce deployment. In such cases, upon receipt of a swarm invocation event 520, the identity of a representative entity (e.g., VDI or slave entity) is determined (step 522) and that determined entity designation is used to access microservices lifecycle predictive model 122. At step 524, learned demand predictions are drawn from the predictive model and such learned demand predictions are in turn used for throttling invocations of the swarm entities (step 528). In some situations, the learned demand predictions have a wide confidence interval. In such cases a contour menu 526 can be used in conjunction with, or in lieu of, strict demand-based throttling (e.g., 10 invocations per second, 100 invocations per second, etc.).

In some situations, servicing a swarm invocation event would necessarily breach the throttling point of the microservices platform. In such a case, headroom can be garnered by implementing managed degradation. What is needed is a rational way to purge certain microservices so as to gather headroom. A naive approach would be to randomly or arbitrarily purge microservices from the microservices platform, however that approach has the unwanted side effect of purging microservices that are not consuming significant resources. This situation where, even if a subject microservice is purged, no significant headroom is garnered, worsens the situation, and is to be avoided, especially when the purged subject microservice had a high resource demand profile for bring-up. An effective technique for microservice purging or quiescence would be to throttle (e.g., quiesce or otherwise derate or purge) only those microservices that can be predicted to reduce resource demands without derating or quiescing microservices that are deemed to be critical microservices. To do so, one approach is to add failure responses into the microservices lifecycle predictive model, and then rely on those trained predictions when deciding which microservices to throttle (e.g., quiesce or otherwise derate or purge). As such, throttling any particular microservice of a microservices platform can be based on outputs of the microservices lifecycle predictive model.

Figure 6A:
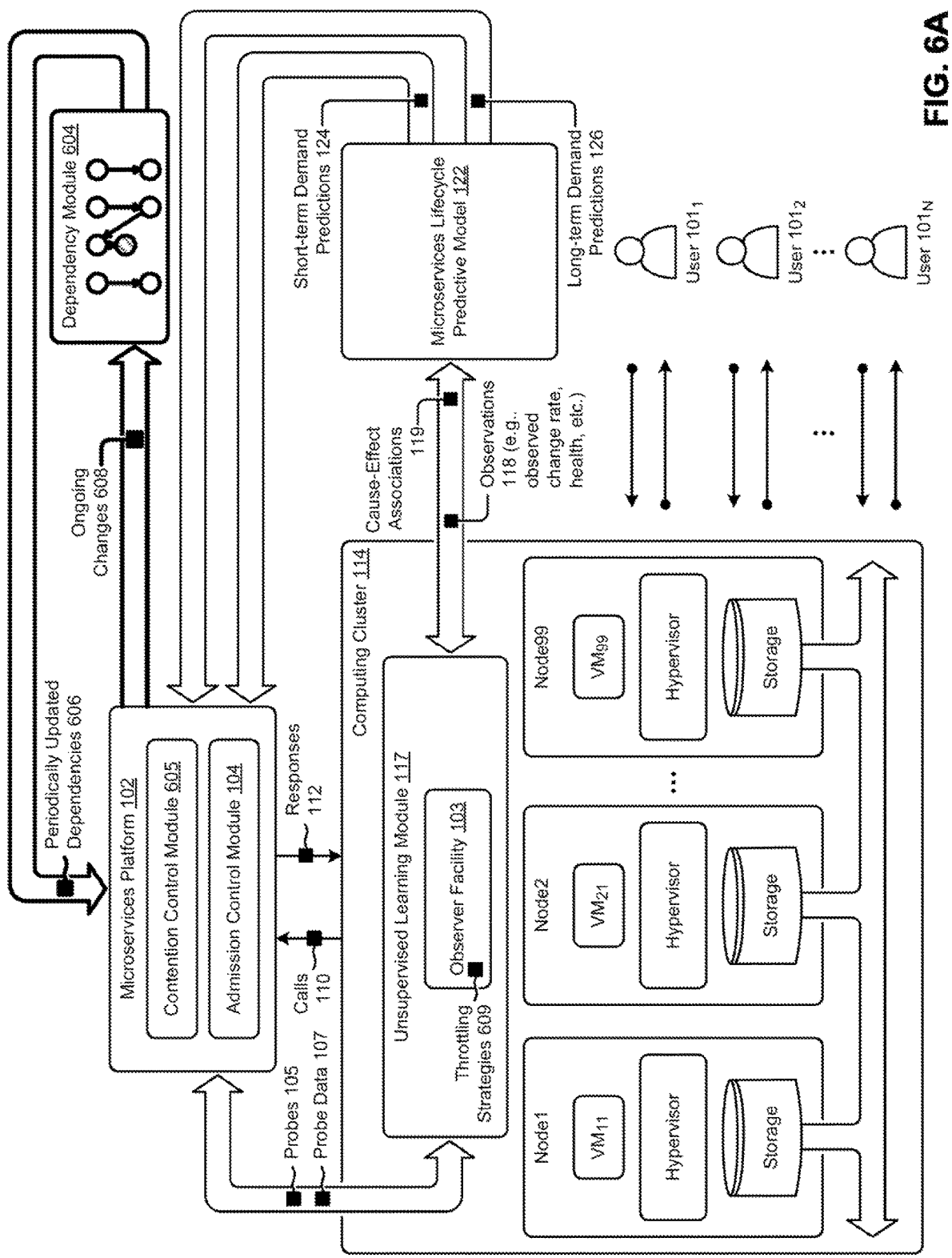
FIG. 6A depicts a system for managed microservices degradation involving use of a continuously trained microservices lifecycle predictive model, according to some embodiments.

Unfortunately, merely having failure responses captured in the microservices lifecycle predictive model fails to consider whether or not any particular microservice would be deemed to be critical in some future scenario. This complication can be addressed by considering dependencies between microservices, and then using this dependency information to avoid derating those particular microservices that are known to be needed in various critical operational scenarios. FIG. 6A shows and describes a system for collecting and using microservices dependency information in various managed microservices degradation scenarios.

FIG. 6A depicts a system for managed microservices degradation involving use of a continuously trained microservices lifecycle predictive model. As an option, one or more variations of the shown system or any aspect thereof may be implemented in the context of the architecture and functionality of the embodiments described herein and/or in any environment.

Referring to FIG. 6A, and specifically referring to the depicted observer facility 103, it can be seen that the observer facility can ingest information from any operational element and/or probe in the system. Further, and as shown, the figure depicts a computing cluster 114 that is in communication with microservices platform 102, which microservices platform is configured to respond to throttling requests or throttling commands (e.g., via calls 110) for the microservices platform to carry out throttling operations.

Over time, the observer facility can process ingested information to produce observations 118 which in turn are delivered to a microservices lifecycle predictive model 122. Furthermore, in the particular partitioning shown, the unsupervised learning module, either by itself or in conjunction with the observer facility, may include multiple throttling strategies 609 (e.g., code and/or data that implements logic for throttling a particular microservice of the microservices platform). Strictly as an example, a throttling strategy can be configured to throttle a particular microservice by applying one or more control mechanisms that, singly or in combination, serve to (a) reduce a priority level of a particular microservice, or (b) quiesce the particular microservice, or (c) cease or halt the particular microservice, and/or (d) purge or evict the particular microservice from the microservices platform. Moreover, a throttling strategy can be configured to throttle a microservice when a short-term demand prediction is high and/or when a long-term demand prediction is high. As such, rather than naively relying on a global throttling strategy that is applied under all conditions, one or another of the throttling strategies can be selected based on any of, a set of then-current conditions, or historical conditions, or predicted conditions in the computing cluster.

While this type of training based on empirical observations can be used to control admission of microservices into the microservices platform, there remain certain deficiencies when there is a need to throttle microservices. Specifically, it is possible that after some period of training it becomes "known" that a certain microservice (e.g., microservice 'Y') had never been invoked at any time during the observation period. This would suggest that that certain microservice (e.g., microservice 'Y') could be throttled or even purged without deleterious effect. However, in this configuration, it can happen that a future call by microservice 'X' might need the facilities of microservice 'Y'. Thus, if microservice 'Y' had been quiesced or derated or otherwise throttled or purged based on predictions of the microservices lifecycle predictive model, then a later invocation or operation of microservice 'X' might fail due to the unavailability or deration of microservice 'Y'. This situation needs to be addressed so as to reduce the likelihood that a future call to microservice 'Y' might be throttled or blocked. Over time, learned quiescence or purging will approach an optimal schedule. Moreover, over time, learned quiescence or purging will approach an equilibrium that satisfies a QOS for the computing cluster as a whole.

The foregoing is merely one example configuration where there is a single dependency relationship between microservice 'X' and microservice 'Y'. Many more complex dependency relationships between microservices emerge in real time as microservices are handled within the microservices platform. As such, what is needed is a way to dynamically-maintain a microservices dependency model.

Example Situations

In some configurations, microservices are deployed as VMs. In other configurations, services run as or in authenticated executable containers. Any/all of these services, whether embodied as one or more VMs or whether embodied as one or more executable containers, have corresponding resource demands—any of which resource demands may increase during ongoing operation. A naive way to address increased demands for resources is to merely deploy additional hardware and software to accommodate such increased resource demands. However, in some situations this may not be possible. Consider the situation where the underlying computing system (e.g., the computing system that hosts an instance of microservices platform 102) is already fully subscribed—in such a case, there are no further resources available to satisfy the increased demands. As another example, consider the situation where the underlying computing system is formed of a collection of a cloud-provider's infrastructure components. In such a situation, user authorization (e.g., tenant authorization) might be needed to contract for whatever resources are demanded. In either or both of these situations, what is needed are approaches that intelligently free up resources by quiescing and/or purging microservices, and then availing of the freed-up resources to satisfy the increased demands.

In situations where it is not possible to add additional infrastructure (e.g., due to the unavailability of sufficient user permissions, or due to oversubscription of the existing infrastructure), one approach to nevertheless free up resources involves analyzing the inter-service dependencies and priorities and then to quiesce or purge certain lower priority microservices—without impacting the availability of those services that are deemed to be critical services.

By intelligently freeing up resources (e.g., by intelligently quiescing and/or purging microservices) the underlying system can undergo a graceful degradation—in some cases a graceful degradation can be performed such that the underlying system is able to survive many types of failures, yet without detectably impacting a customer's experience.

To accommodate graceful degradation, the shown microservices platform 102 includes a contention control module 605. Such a contention control module is configured to ingest (1) outputs of a dependency module 604, and (2) outputs of a microservices lifecycle predictive model 122. In the system of FIG. 6A, the dependency module continuously ingests ongoing changes 608 so as to continuously maintain a dependency graph having periodically updated dependencies 606. As such, at any moment in time, the contention control module can be aware of which microservices depend on other microservices. Dependency information can be used by the contention control module to ensure that operational readiness is not deleteriously impacted even when certain microservices are throttled.

As used herein, the verb "to throttle" or the gerund "throttling" refers to any technique whereby resource usage by a particular microservice is subjected to a control mechanism such that fewer resources are demanded by the particular microservice than would be demanded in absence of the control mechanism. Strictly as examples, a control mechanism can employ one or more of, a reduction of a priority level of the particular microservice, a quiescence of the particular microservice, a cessation and/or halting of the particular microservice, and/or a purging or eviction of the particular microservice from the microservices platform. The act or acts that serve "to throttle" and/or the acts corresponding to "throttling" can be carried out (e.g., in response to an observation of contention for resources) in such a manner that contention may be reduced or eliminated. In some cases the act or acts that serve "to throttle" and/or the acts corresponding to "throttling" can include moving the particular microservice to a computing platform that has fewer resources available to supply to the particular microservice.

After the contention control module ensures that operational readiness would not be deleteriously impacted even when certain critical microservices are quiesced or derated or throttled or purged, there still remains the task of deciding which remaining non-critical microservices are candidates for being quiesced or derated or throttled or purged. In embodiments that include a microservices lifecycle predictive model such as is shown in FIG. 6A, this can be accomplished by considering certain candidates against other candidates with respect to the learned short-term demand predictions 124 and learned long-term demand predictions 126. To illustrate, consider a situation where the microservices lifecycle predictive model has been trained using signals that were observed upon and after occurrence of an indicator of attack (IoA) in a data center.

Further consider that in the event of a later observed IoA, and upon model stimulation, the model indicates a high short-term demand prediction (e.g., while the IoA is being remediated) followed by a high long-term demand prediction (e.g., when additional attack-thwarting services are busily running). In this situation, non-critical microservices such background operations would be selected as candidates for being quiesced or derated or throttled or purged, whereas services related to security monitoring and enforcement (e.g., to remediate the IoA) would be deemed as critical and would not be selected to be quiesced or derated or throttled or purged—even though the services related to security monitoring and enforcement might have been an initial candidate for quiescing since those services exhibit high demand profiles.

The foregoing determination as to which microservices are critical and/or which microservices have dependencies on other critical microservices can be made through use of a machine readable representation of a microservice dependency chart. One such microservice dependency chart is shown and described as pertains to FIG. 6B.

Figure 6B:
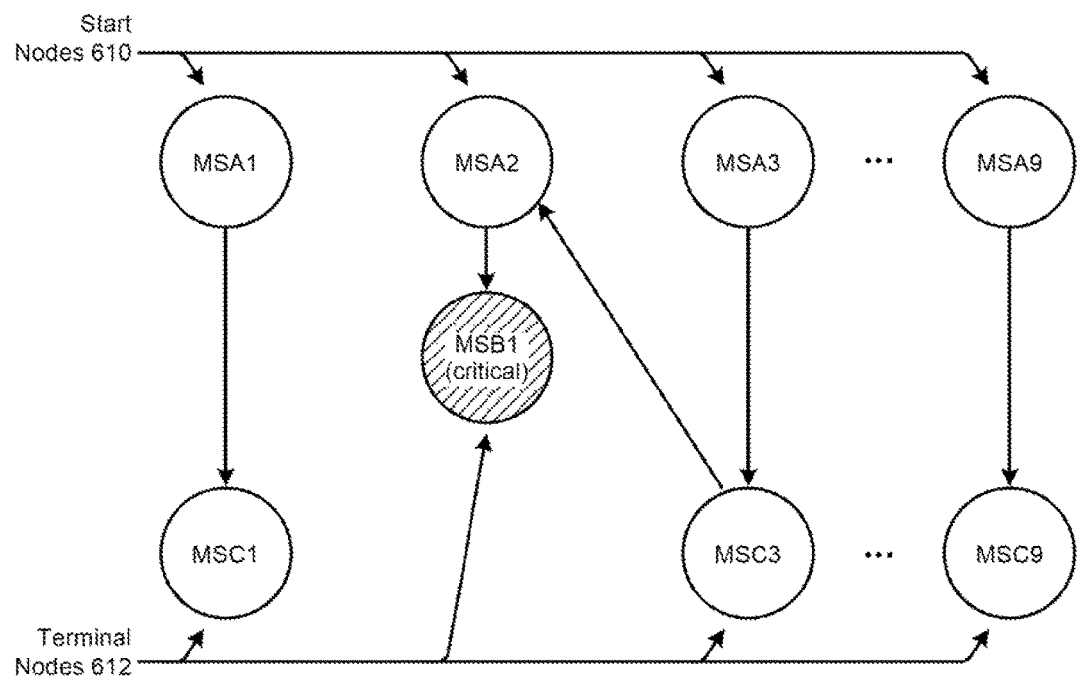
FIG. 6B depicts a microservice dependency chart as used by a microservices platform in conjunction with a continuously trained microservices lifecycle predictive model, according to some embodiments.

FIG. 6B depicts a microservice dependency chart as used by a microservices platform in conjunction with a continuously trained microservices lifecycle predictive model, according to some embodiments. As an option, one or more variations of technique 6B00 or any aspect thereof may be implemented in the context of the architecture and functionality of the embodiments described herein and/or in any environment.

In order to avoid inadvertent quiescing or purging of microservices that are deemed to be critical, there needs to be some way to know if a particular microservice is dependent on other microservices or subroutines that are themselves deemed to be critical. One way to deal with this is to characterize in an a priori manner (e.g., by an administrator) whether a particular microservice is deemed to be critical. Another way to deal with this is to provide monitoring of health metrics of the microservices during handling of a failure event and mark those microservices that are heavily in use during remediation of the failure event as critical. Later, in case of resource contention, it will then be possible to scale down or shut down non-critical microservices in a manner that is consistent with a learned prioritization.

To monitor the health metrics of the microservices, the service manager probes the traces for all microservice calls and microservice responses between the different microservices. Next it constructs a dependency graph. Further, and in real time, a service manager (e.g., dependency module 604 of FIG. 6A) estimates causal graphs from high-dimensional time series datasets (e.g., based on causal discovery) and then uses these graphs to ensure that critical microservices do not get derated or throttled or shut down.

During a period of contention for resources, a further service module (e.g., contention control module 605 of FIG. 6A) computes the oversubscription load and in turn, quiesces, derates, and/or otherwise scales down non-critical microservices using the abovementioned causal information.

The example embodiment shown in FIG. 6B, depicts the microservices interaction scenario where a first set of microservices (e.g., MSA1, MSA2, MSA3, . . . , MSA9) calls a second set of microservices (e.g., MSC1, MSB1, MSC3, . . . , MSC9). In this specific example, microservice MSB1 is deemed to be critical. As such, any path that traverses through MSB1 is also deemed to be critical. All paths from a particular one of the start nodes 610 through other nodes (if any), and ending at one of the terminal nodes 612 are enumerated. Some paths will be longer than other paths.

In some cases, and as shown, a longer path (e.g., MSA3→MSC3→MSA2→MSB1) may include a shorter path (MSA2→MSB1) that traverses through MSB1. Such a longer path is also deemed to be a critical path and, as such, nodes on the longer path are excluded from consideration when determining which microservices to quiesce, or derate, or purge in response to an anomalous event such as a node or storage unit degradation or failure.

Figure 6C:
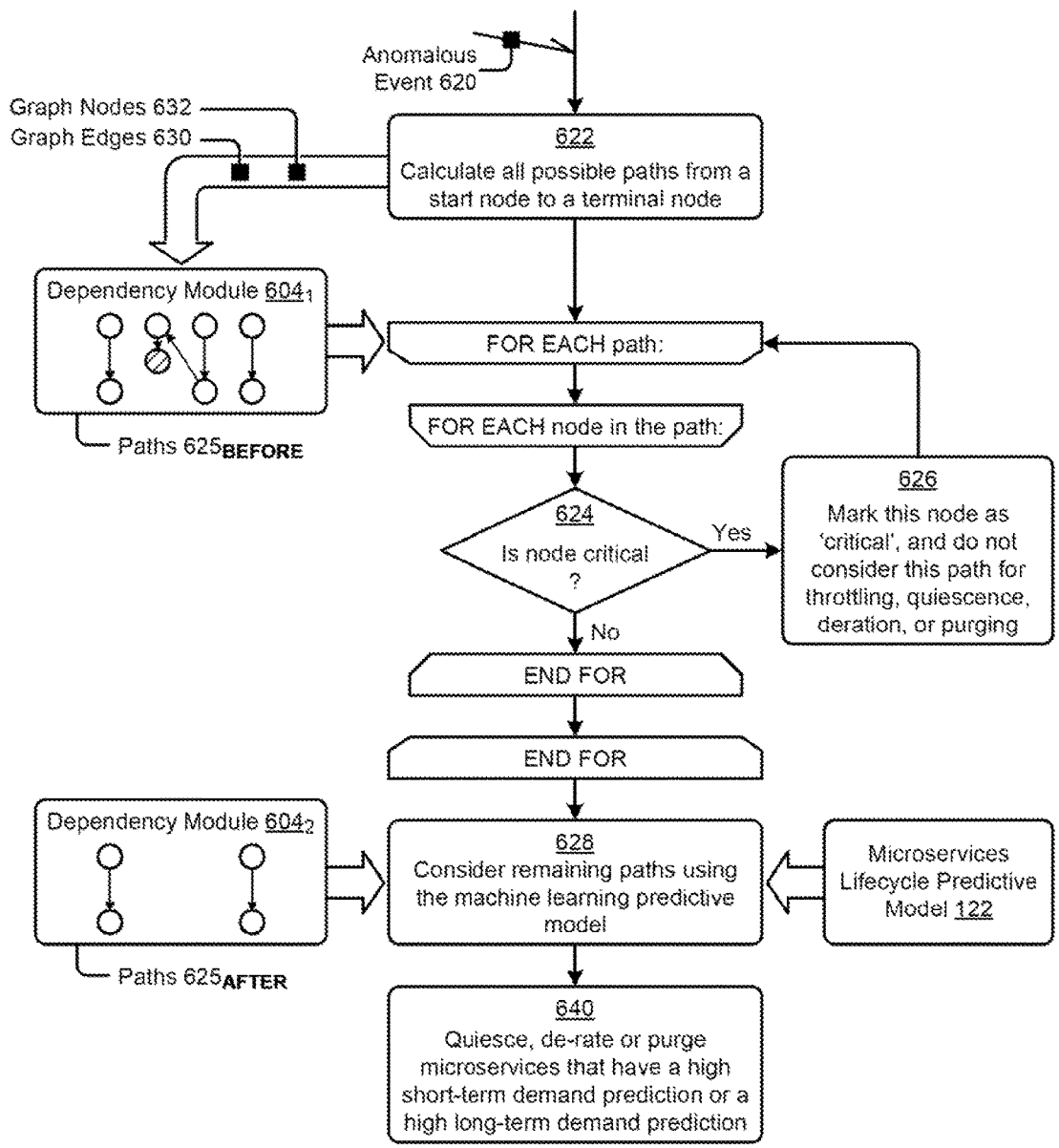
FIG. 6C is a flowchart depicting use of a microservice dependency chart in conjunction with a continuously trained microservices lifecycle predictive model, according to some embodiments.

One technique for determining which microservices to quiesce, or derate, or purge in response to an anomalous event such as a node or storage unit degradation or failure is shown and described as pertains to FIG. 6C.

FIG. 6C is a flowchart depicting use of a microservice dependency chart in conjunction with a continuously trained microservices lifecycle predictive model. As an option, one or more variations of technique 6C00 or any aspect thereof may be implemented in the context of the architecture and functionality of the embodiments described herein and/or in any environment.

The figure is being presented to illustrate how critical microservices can be excluded from deration or purging consideration. Microservice deration or purging can be performed under a variety of situations that become present in clustered computing. As one example, microservice deration or purging might be needed when the computing cluster has experienced some type of anomalous event (e.g., a failure of some sort, or detection of a bully virtual machine) where the computing cluster is attempting to self-remediate from the anomalous event. More specifically, microservice deration or purging might be appropriate if/when the computing cluster has breached a predefined operational threshold, or if/when the computing cluster is operating at a capacity near a dynamically-determined choking point. In either of these scenarios, it is often felicitous to "give back" some computing resources by derating certain microservices. FIG. 6C illustrates how technique 6C00 can be applied in response to occurrence of an anomalous event. As can be seen, the flow of FIG. 6C concludes by derating certain non-critical microservices while not derating critical microservices.

As shown, technique 6C00 commences upon detection of an anomalous event 620. In this context, an anomalous event is deemed to be an event that corresponds to a failure event or loss of function event, or an event that is known to precede a failure event or loss of function event. Regardless of the nature of and/or circumstances surrounding the anomalous event, technique 6C00 serves to govern (e.g., reduce) ongoing computing demand such that computing resources are freed up to allow for remediation. For example, consider the situation where a first node of a plurality of nodes of a computing cluster is overloaded with a large number of VMs, whereas a second node of the same computing cluster is underloaded. Remediation might entail rebalancing. However, the act of rebalancing would demand, at least temporarily, additional computing resources on the overloaded node. The demand for additional computing resources on the overloaded node can be accommodated by quiescing or derating certain microservices from the microservices platform. Given a bit more headroom on the overloaded node (e.g., due to the derating or quiescing of certain microservices of the microservices platform) load balancing remediation activities can proceed, possibly alleviating the situation that raised the anomalous event.

One further refinement present in the shown technique is the mechanism by which critical microservices are not considered as candidates for derating. In this example, microservices that are used in processes involving load rebalancing are deemed to be critical microservices, and as such are not derated or throttled.

The technique of avoiding deration of critical microservices, taken in combination with the technique of derating microservices that exhibit high demand, thusly allows for the load rebalancing processes to proceed, while at the same time, since the microservices are merely derated or throttled, the cluster's users might not experience any human-detectable performance degradation.

Continuing with the discussion of FIG. 6C, in response to occurrence of an anomalous event 620, step 622 serves to calculate all possible paths from all start nodes 610 to their respective terminal nodes 612. Such paths can be codified as graphs composed of graph nodes 632 and graph edges 630. Such graphs can be maintained in a dependency-specific module (e.g., dependency module 604₁) which can provide a requestor with an enumeration of such paths (e.g., paths $625_{BEFORE}$). Then, for each path, and for each graph node on the path, that graph node is subjected to a test as to whether or not that graph node is deemed to be a critical graph node or not. If so, then the "Yes" branch of decision 624 is taken, the graph node is marked with a critical label, and, at step 626, the path corresponding to the critical graph node is excluded from consideration for throttling. On the other hand, if a particular graph node is deemed to be not a critical graph node, then the "No" path of decision 624 is taken, thus leaving open the possibility that the path corresponding to the considered node might be considered for throttling.

As is known in the art, a microservices platform that serves a computing cluster might host a large number of microservices, and in some cases such a microservices platform might end up with a large number of non-critical microservice paths to be considered for throttling.

Consistent with the foregoing, it would be advantageous to quiesce, derate or purge those non-critical microservices (or paths through a plurality of microservices) that exhibit high demand for resources, thus leaving available computing resources for the purpose of alleviating the situation that raised the anomalous event in the first place. Accordingly, step 628 considers the remaining non-critical paths (e.g., paths $625_{AFTER}$ of dependency module 604₂) with respect to their resource demands. After processing through step 628, step 640 can quiesce or derate or purge microservices that have either a high short-term demand prediction or a high long-term demand prediction. Once those microservices that are associated with high resource demands have been quiesced or derated or throttled, the various activities that serve to alleviate the situation that raised the anomalous event in the first place can make progress. When the situation that raised the anomalous event in the first place has been alleviated, then the affected microservices can be returned to their former state.

In some embodiments, step 640 is informed by a QOS metric. The extent to which microservices are quiesced or derated or purged can be controlled such that when the then-current conditions on the cluster comport with the specific QOS, then further quiescence or derations or purging operation can be deferred. This is to ensure that no more than the necessary microservices are quiesced or derated or purged, which in turn means that the computing cluster can quickly return to full operational performance once the cause of the anomalous event 620 has been remediated.

Additional Embodiments of the Disclosure

In various embodiments, one or more ML models are trained to estimate the change rate and health of individual VMs (e.g., based on VM information), categorization of VMs into different types of VMs (e.g., such as VDIs, middleware, database and other servers, etc.). The change rate and health of individual VMs can be combined with other system information (e.g., IOPS, VM size, time variance, health variance, a priori prioritization assignments, etc.) to come up with a further qualified change rate estimation for each VM.

The foregoing information can be used to inform ongoing tasks (e.g., demand planning estimations, additional capacity plan estimations, load balancing tasks, etc.). For example, based on a capacity planning resource prediction, an estimate of future capacities and demands can be extrapolated. Further, when a predicted/estimated future demand of any one or more currently active entities exceeds a "hot spot" threshold (e.g., >80% of assigned capacity), operational aspects of those one or more currently active entities can be labeled and entered into the ML model.

In some implementations, one or more ML models are specifically trained using quantified user actions/behaviors. Such an ML model can predict the timing and type of forecastable behavior. Such a model can be trained in accordance with observations taken over any time period or time scale (e.g. hour by hour throughout the day). To illustrate by example, when a particular user VM is started (e.g., at the beginning of a day), predictions can be taken from the ML model(s) and the system can take action proactively on behalf of that user VM. For example, in the morning, when the user VM is started, the proactive actions might include loading of any/all microservice components that are predictably going to be needed by the user VM. In some cases the proactive actions might extend to fetching of data pertaining to operations that are predictably going to be carried out later in the day.

Instruction Code Examples

Figure 7A:
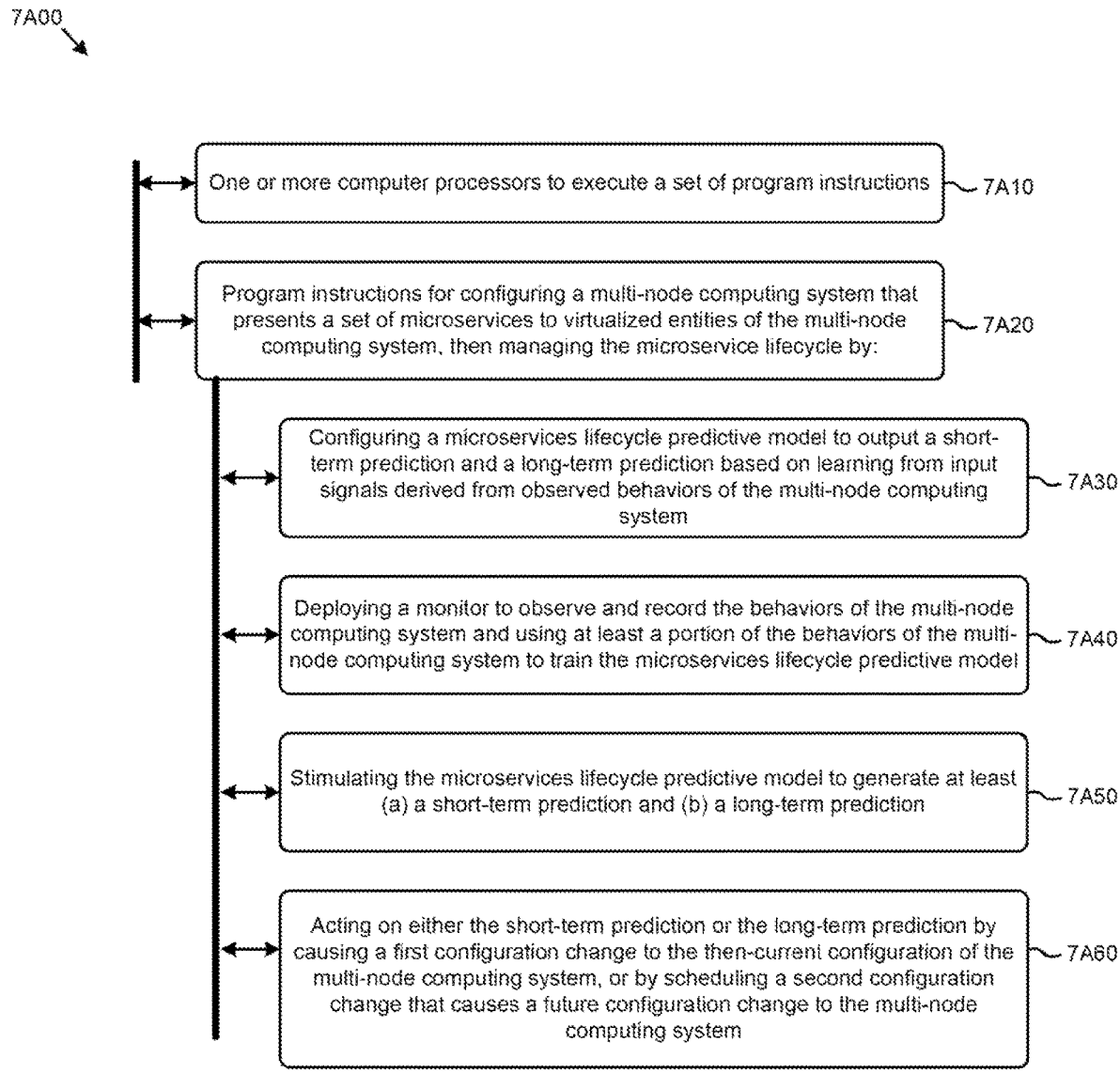
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address having too few or erroneous predictions about a microservice's future. The partitioning of system 7A00 is merely illustrative and other partitions are possible.

The system includes one or more computer processors to execute a set of program instructions (module 7A10) that perform acts of: configuring a multi-node computing system that presents a set of microservices to virtualized entities of the multi-node computing system (module 7A20); then managing the microservice lifecycle by: configuring a microservices lifecycle predictive model to output a short-term prediction and a long-term prediction based on learning from input signals derived from observed behaviors of the multi-node computing system (module 7A30); deploying a monitor to observe and record the behaviors of the multi-node computing system and using at least a portion of the behaviors of the multi-node computing system to train the microservices lifecycle predictive model (module 7A40); stimulating the microservices lifecycle predictive model to generate at least (a) a short-term prediction and (b) a long-term prediction (module 7A50); and acting on either the short-term prediction or the long-term prediction by causing a first configuration change to the then-current configuration of the multi-node computing system, or by scheduling a second configuration change that causes a future configuration change to the multi-node computing system (module 7A60).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7B:
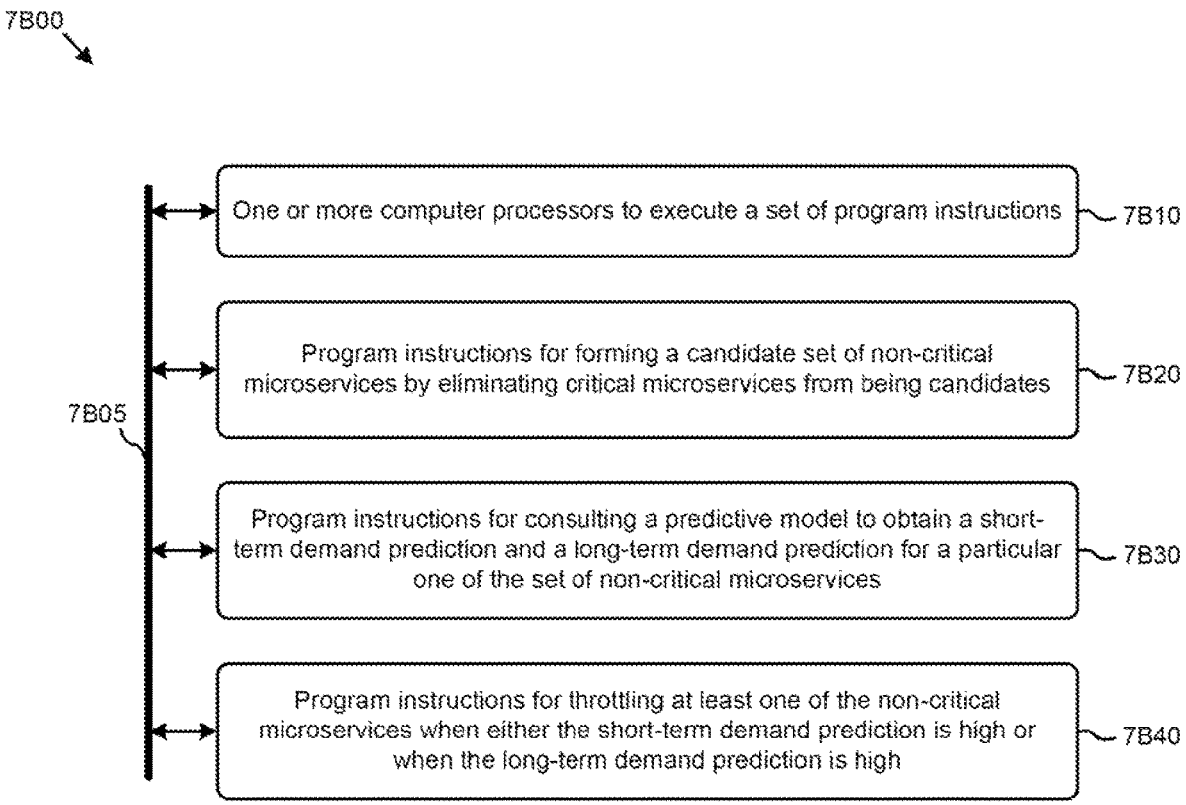

FIG. 7B depicts a system 7B00 as an arrangement of computing modules that are interconnected so as to operate cooperatively to implement certain of the herein-disclosed embodiments. This and other embodiments present particular arrangements of elements that, individually or as combined, serve to form improved technological processes that address having too few or erroneous predictions about a microservice's future. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims.

The shown embodiment implements a portion of a computer system, presented as system 7B00, comprising one or more computer processors to execute a set of program code instructions (module 7B10) and modules for accessing memory to hold program code instructions to perform: forming a candidate set of non-critical microservices by eliminating critical microservices from being candidates (module 7B20); consulting a predictive model to obtain a short-term demand prediction and a long-term demand prediction for a particular one of the set of non-critical microservices (module 7B30); and throttling at least one of the non-critical microservices when either the short-term demand prediction is high or when the long-term demand prediction is high (module 7B40).

System Architecture Overview

Additional System Architecture Examples

All or portions of any of the foregoing techniques can be partitioned into one or more modules and instanced within, or as, or in conjunction with, a virtualized controller in a virtual computing environment. Some example instances of virtualized controllers situated within various virtual computing environments are shown and discussed as pertains to FIG. 8A, FIG. 8B, FIG. 8C, and FIG. 8D.

Figure 8A:
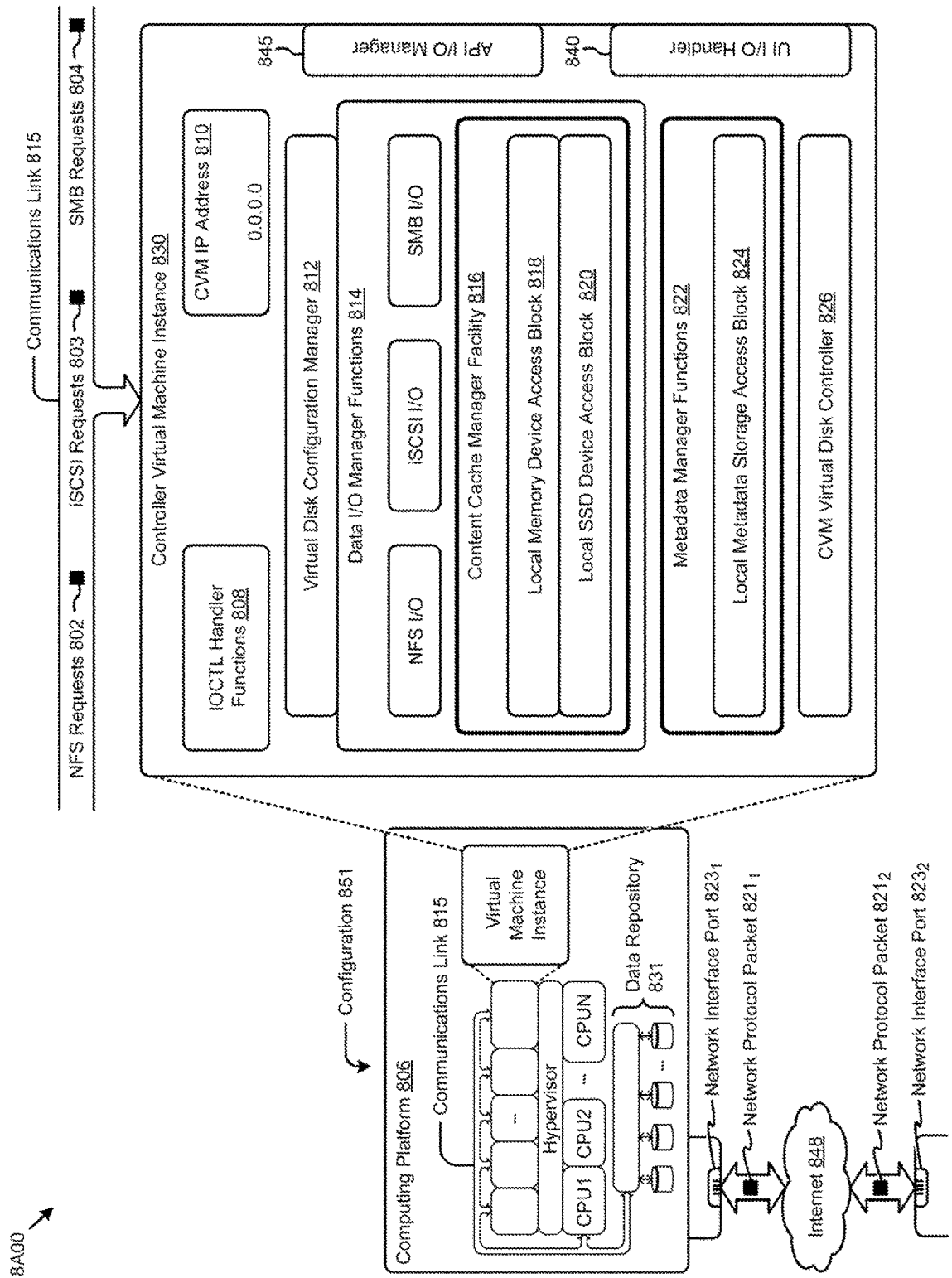
FIG. 8A, FIG. 8B, FIG. 8C, and FIG. 8D depict virtualization system architectures comprising collections of interconnected components suitable for implementing embodiments of the present disclosure and/or for use in the herein-described environments.

FIG. 8A depicts a virtualized controller as implemented in the shown virtual machine architecture 8A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines are configured for processing of storage inputs or outputs (I/O or IO) as received from any or every source within the computing platform. An example implementation of such a virtual machine that processes storage I/O is depicted as 830.

In this and other configurations, a controller virtual machine instance receives block I/O storage requests as network file system (NFS) requests in the form of NFS requests 802, and/or internet small computer system interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output can be handled by one or more IO control (IOCTL) handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS TO, iSCSI IO, SMB TO, etc.).

In addition to block IO functions, configuration 851 supports input or output (TO) of any form (e.g., block TO, streaming IO) and/or packet-based IO such as hypertext transport protocol (HTTP) traffic, etc., through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; compact disk read-only memory (CD-ROM) or any other optical medium; punch cards, paper tape, or any other physical medium with patterns of holes; or any random access memory (RAM), programmable read-only memory (PROM), erasable programmable read-only memory (EPROM), flash memory EPROM (FLASH-EPROM), or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a central processing unit (CPU) or data processor or graphics processing unit (GPU), or such as any type or instance of a processor (e.g., CPU1, CPU2, . . . , CPUN). According to certain embodiments of the disclosure, two or more instances of configuration 851 can be coupled by communications link 815 (e.g., backplane, local area network, public switched telephone network, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port 8231 and network interface port 8232). Configuration 851 can be addressed through one or more network interface ports using an IP address. Any operational element within computing platform 806 can perform sending and receiving operations using any of a range of network protocols, possibly including network protocols that send and receive packets (e.g., network protocol packet 8211 and network protocol packet 8212).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A computing cluster is often embodied as a collection of computing nodes that can communicate between each other through a local area network (LAN) and/or through a virtual LAN (VLAN) and/or over a backplane. Some computing clusters are characterized by assignment of a particular set of the aforementioned computing nodes to access a shared storage facility that is also configured to communicate over the local area network or backplane. In many cases, the physical bounds of a computing cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger computing clusters.

For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple computing clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to continuously training microservices lifecycle prediction models in a multi-node computing environment. In some embodiments, a module may include one or more state machines and/or combinational logic used to implement or facilitate the operational and/or performance characteristics pertaining to continuously training microservices lifecycle prediction models in a multi-node computing environment.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of continuously training microservices lifecycle prediction models in a multi-node computing environment). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to continuously training microservices lifecycle prediction models in a multi-node computing environment, and/or for improving the way data is manipulated when performing computerized operations pertaining to handling long-term demand predictions separately from short-term demand predictions.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTU- ALIZATION ENVIRONMENT" issued on Oct. 1, 2013, which is hereby incorporated by reference in its entirety.

Figure 8B:
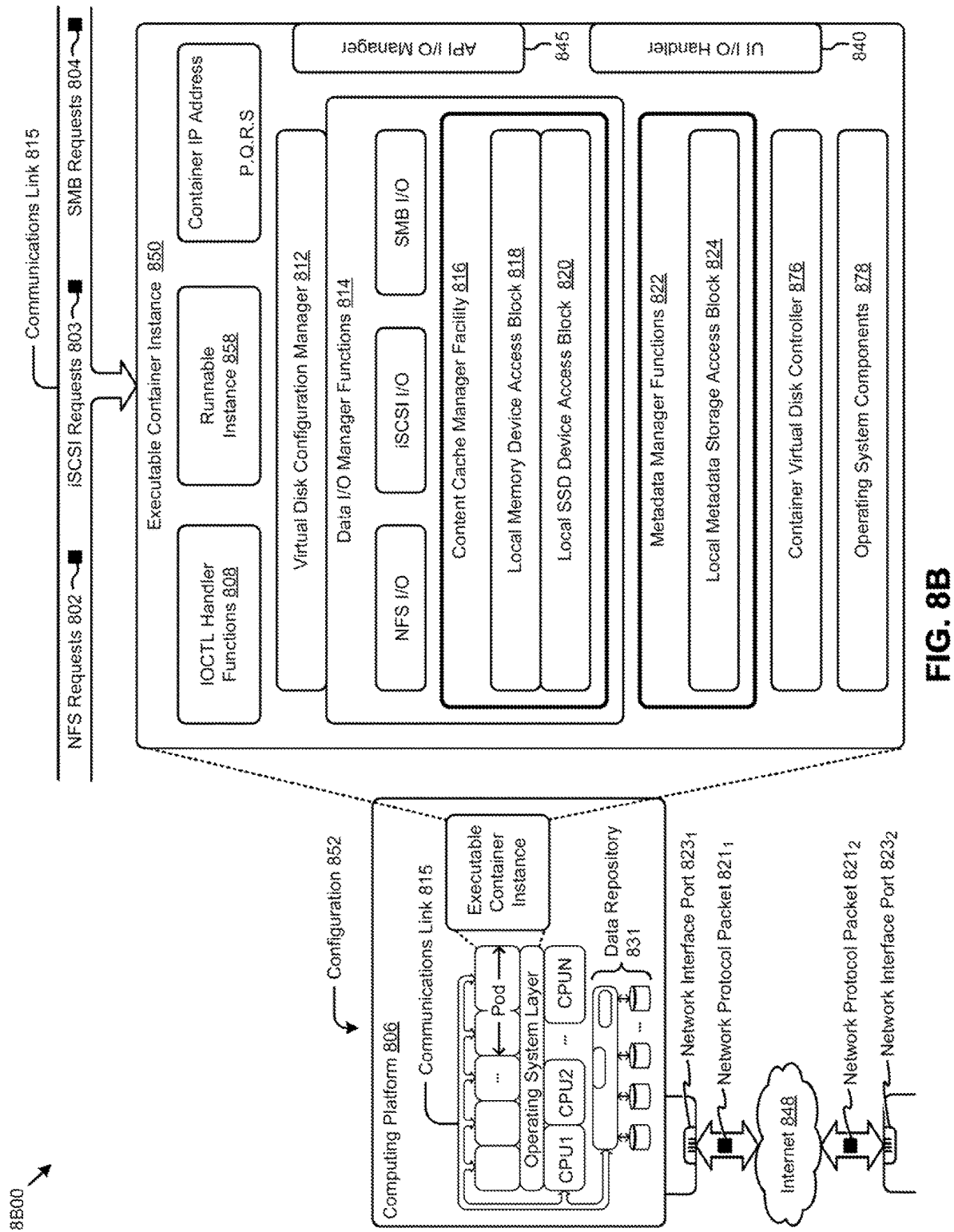

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification, possibly including the hypertext transport protocol (HTTP or "http:") and/or possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include any or all of any or all library entries and/or operating system (OS) functions, and/or OS-like functions as may be needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
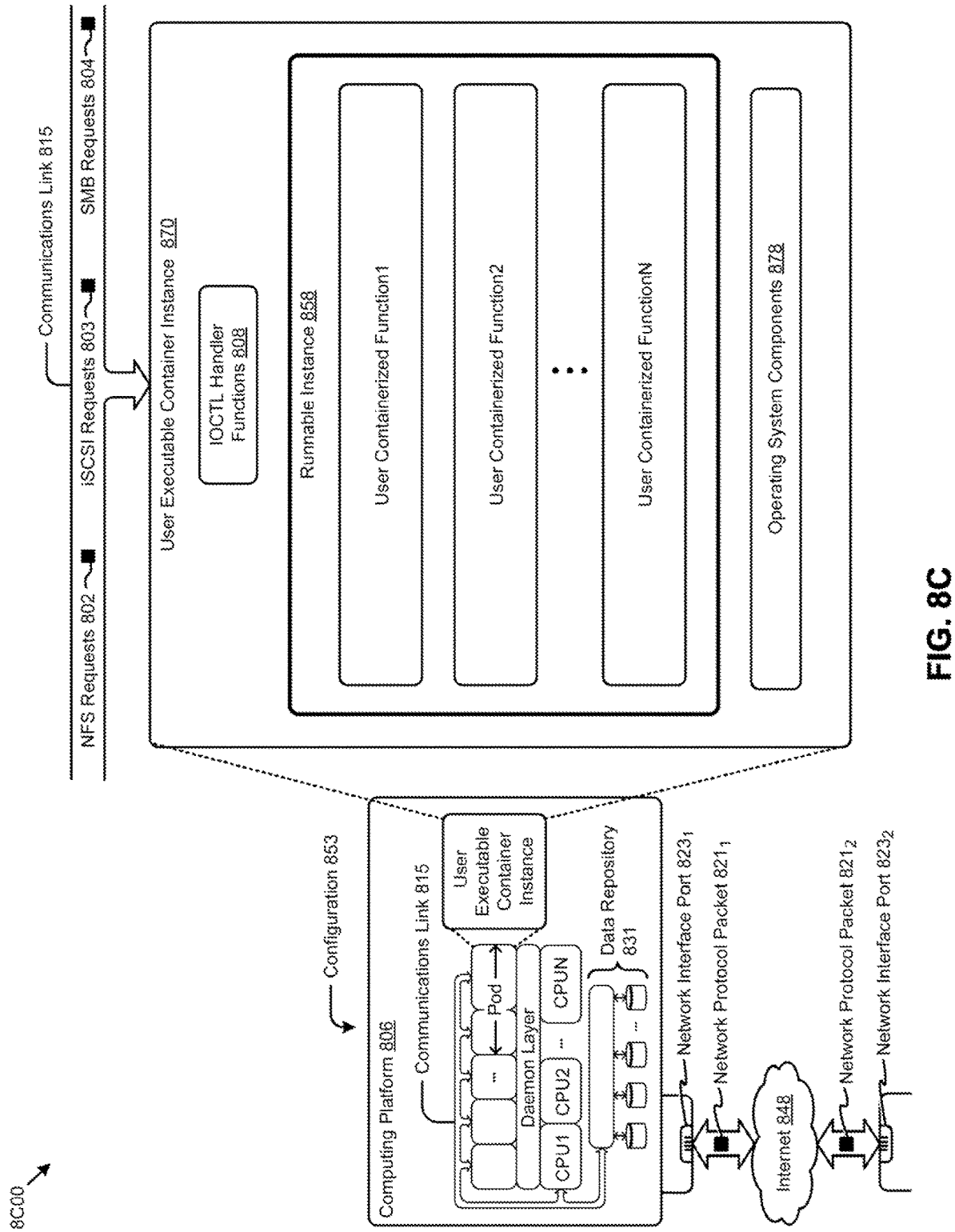

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 870.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (NAS) and/or may include all or portions of a storage area network (SAN). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 8D:
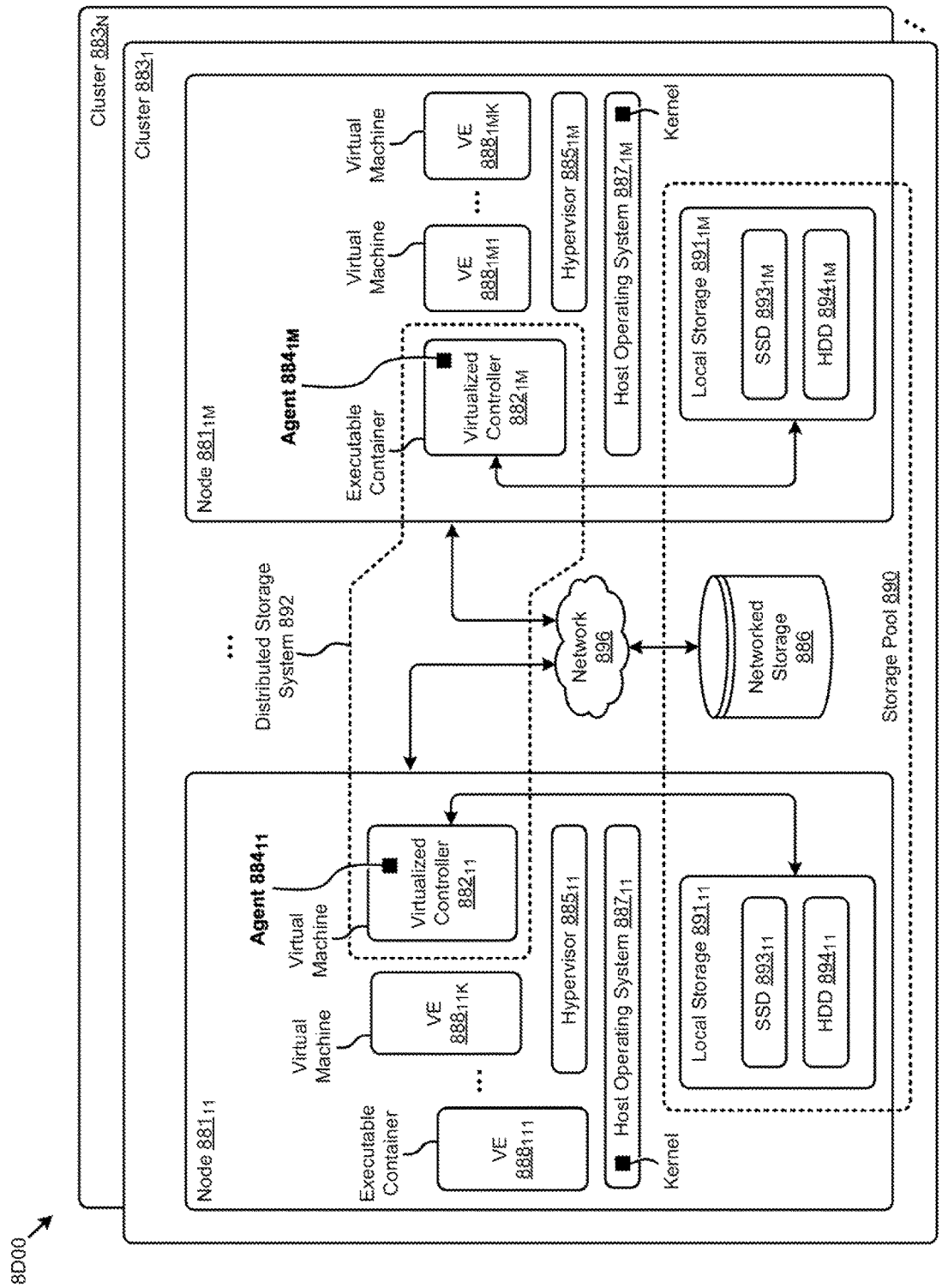

FIG. 8D depicts a distributed virtualization system in a multi-cluster environment 8D00. The shown distributed virtualization system is configured to be used to implement the herein disclosed techniques. Specifically, the distributed virtualization system of FIG. 8D comprises multiple computing clusters (e.g., cluster $883_1$, . . . , cluster $883_N$) comprising multiple nodes that have multiple tiers of storage in a storage pool. Representative nodes (e.g., node $881_{11}$, . . . , node $881_{1M}$) and storage pool 890 associated with cluster $883_1$ are shown. Each node can be associated with one server, multiple servers, or portions of a server. The nodes can be associated (e.g., logically and/or physically) with the computing clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage $891_{11}$, . . . , local storage $891_{1M}$). For example, the local storage can be within or directly attached to a server and/or appliance associated with the nodes. Such local storage can include solid state drives (SSD $893_{11}$, . . . , SSD $893_{1M}$), hard disk drives (HDD $894_{11}$, . . . , HDD $894_{1M}$), and/or other storage devices.

As shown, any of the nodes of the distributed virtualization system can implement one or more user virtualized entities (VEs) such as the virtualized entity (VE) instances shown as VE $888_{111}$, . . . , VE $888_{11K}$, VE $888_{1M1}$, VE $888_{1MK}$, and/or a distributed virtualization system can implement one or more virtualized entities that may be embodied as a virtual machines (VM) and/or as an executable container. The VEs can be characterized as software-based computing "machines" implemented in a container-based or hypervisor-assisted virtualization environment that emulates underlying hardware resources (e.g., CPU, memory, etc.) of the nodes. For example, multiple VMs can operate on one physical machine (e.g., node host computer) running a single host operating system (e.g., host operating system $887_{11}$, . . . , host operating system $887_{1M}$), while the VMs run multiple applications on various respective guest operating systems. Such flexibility can be facilitated at least in part by a hypervisor (e.g., hypervisor $885_{11}$, hypervisor $885_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers comprise groups of processes and/or may use resources (e.g., memory, CPU, disk, etc.) that are isolated from the node host computer and other containers. Such executable containers directly interface with the kernel of the host operating system (e.g., host operating system $887_{11}$, . . . , host operating system $887_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a computing cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $881_{11}$ can interface with a controller virtual machine (e.g., virtualized controller $882_{11}$) through hypervisor $885_{11}$ to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller $882_{1M}$) in an operating system virtualization environment at a given node. In this case, for example, the virtualized entities at node $881_{1M}$ can access the storage pool 890 by interfacing with a controller container (e.g., virtualized controller $882_{1M}$) through hypervisor $885_{1M}$ and/or the kernel of host operating system $887_{1M}$.

In certain embodiments, one or more instances of an agent can be implemented in the distributed storage system 892 to facilitate the herein disclosed techniques. Specifically, agent $884_{11}$ can be implemented in the virtualized controller $882_{11}$, and agent $884_{1M}$ can be implemented in the virtualized controller $882_{1M}$. Such instances of the virtualized controller can be implemented in any node in any computing cluster. Actions taken by one or more instances of the virtualized controller can apply to a node (or between nodes), and/or to a cluster (or between clusters), and/or between any resources or subsystems accessible by the virtualized controller or their agents.

Solutions attendant to handling long-term demand predictions independently from short-term demand predictions and vice versa can be brought to bear through implementation of any one or more of the foregoing techniques. Moreover, any aspect or aspects of having too few or erroneous predictions about a microservice's future can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause acts comprising:
    maintaining a microservices platform that responds to one or more throttling commands, wherein multiple throttling strategies are individually selectable by the microservices platform, individual ones of the multiple throttling strategies use at least one prediction model that outputs long-term and short-term demand predictions;
    in response to receiving a first microservices throttling command at a first time under first conditions, using the at least one prediction model to select a first throttling strategy of the multiple throttling strategies to use to throttle a microservice, the first throttling strategy being selected based upon a first long-term or short-term demand prediction; and
    in response to receiving a second microservices throttling command at a second time under second conditions, using the at least one prediction model to select a second throttling strategy of the multiple throttling strategies to use to throttle the microservice, the second throttling strategy being selected based upon a second long-term or short-term demand prediction,
    wherein the first and second conditions are different, the first and second long-term or short-term demand predictions are different, and the first and second strategies are different.

2. The non-transitory computer readable medium of claim 1, wherein respective long-term demand predictions correspond to a first time range that is longer than a second time range of a corresponding short-term demand predictions.

3. The non-transitory computer readable medium of claim 2, wherein the at least one prediction model corresponds to a short-term prediction and a long-term prediction based on learning from input signals derived from observed behaviors of a multi-node computing system.

4. The non-transitory computer readable medium of claim 1, wherein the acts further comprise forming a candidate set of non-critical microservices by accessing the microservices platform to identify a set of microservices hosted on the microservices platform, and eliminating microservices that are associated with a critical label from the candidate set.

5. The non-transitory computer readable medium of claim 4, wherein the microservice is marked as critical based on monitoring of health metrics of the microservice during handling of a failure event.

6. The non-transitory computer readable medium of claim 1, wherein the acts further comprise throttling a non-critical microservice when either the short-term demand prediction of the non-critical microservice is high or when the long-term demand prediction of the non-critical microservice is high.

7. The non-transitory computer readable medium of claim 6, wherein the acts further comprise throttling additional non-critical microservices until the microservices platform is operating below a choke point threshold.

8. The non-transitory computer readable medium of claim 1, wherein input signals derived from observed behaviors comprise at least one of, CPU demands, network services demands, or storage facilities demands.

9. A method comprising:
maintaining a microservices platform that responds to one or more throttling commands, wherein multiple throttling strategies are individually selectable by the microservices platform, individual ones of the multiple throttling strategies use at least one prediction model that outputs long-term and short-term demand predictions;
in response to receiving a first microservices throttling command at a first time under first conditions, using the at least one prediction model to select a first throttling strategy of the multiple throttling strategies to use to throttle a microservice, the first throttling strategy being selected based upon a first long-term or short-term demand prediction; and
in response to receiving a second microservices throttling command at a second time under second conditions, using the at least one prediction model to select a second throttling strategy of the multiple throttling strategies to use to throttle the microservice, the second throttling strategy being selected based upon a second long-term or short-term demand prediction,
wherein the first and second conditions are different, the first and second long-term or short-term demand predictions are different, and the first and second strategies are different.

10. The method of claim 9, wherein respective long-term demand predictions correspond to a first time range that is longer than a second time range of a corresponding short-term demand predictions.

11. The method of claim 10, wherein the at least one prediction model corresponds to a short-term prediction and a long-term prediction based on learning from input signals derived from observed behaviors of a multi-node computing system.

12. The method of claim 9, further comprising forming a candidate set of non-critical microservices by accessing the microservices platform to identify a set of microservices hosted on the microservices platform, and eliminating microservices that are associated with a critical label from the candidate set.

13. The method of claim 12, wherein the microservice is marked as critical based on monitoring of health metrics of the microservice during handling of a failure event.

14. The method of claim 9, further comprising throttling a non-critical microservice when either the short-term demand prediction of the non-critical microservice is high or when the long-term demand prediction of the non-critical microservice is high.

15. The method of claim 14, further comprising throttling additional non-critical microservices until the microservices platform is operating below a choke point threshold.

16. The method of claim 9, wherein input signals derived from observed behaviors comprise at least one of, CPU demands, network services demands, or storage facilities demands.

17. A system comprising:
a storage medium having stored thereon a sequence of instructions; and
a processor that executes the sequence of instructions to cause acts comprising,
maintaining a microservices platform that responds to one or more throttling commands, wherein multiple throttling strategies are individually selectable by the microservices platform, individual ones of the multiple throttling strategies use at least one prediction model that outputs long-term and short-term demand predictions;
in response to receiving a first microservices throttling command at a first time under first conditions, using the at least one prediction model to select a first throttling strategy of the multiple throttling strategies to use to throttle a microservice, the first throttling strategy being selected based upon a first long-term or short-term demand prediction; and
in response to receiving a second microservices throttling command at a second time under second conditions, using the at least one prediction model to select a second throttling strategy of the multiple throttling strategies to use to throttle the microservice, the second throttling strategy being selected based upon a second long-term or short-term demand prediction,
wherein the first and second conditions are different, the first and second long-term or short-term demand predictions are different, and the first and second strategies are different.

18. The system of claim 17, wherein respective long-term demand predictions correspond to a first time range that is longer than a second time range of a corresponding short-term demand predictions.

19. The system of claim 18, wherein the at least one prediction model corresponds to a short-term prediction and a long-term prediction based on learning from input signals derived from observed behaviors of a multi-node computing system.

20. The system of claim 17, wherein the acts further comprise forming a candidate set of non-critical microservices by accessing the microservices platform to identify a set of microservices hosted on the microservices platform, then eliminating microservices that are associated with a critical label from the candidate set.

21. The system of claim 20, wherein the microservice is marked as critical based on monitoring of health metrics of the microservice during handling of a failure event.

22. The system of claim 17, wherein the acts further comprise throttling a further non-critical microservice when either the short-term demand prediction of the further non-critical microservice is high or when the long-term demand prediction of the further non-critical microservice is high.

23. The system of claim 22, wherein the acts further comprise throttling additional non-critical microservices until the microservices platform is operating below a choke point threshold.

24. The system of claim 17, wherein input signals derived from observed behaviors comprise at least one of, CPU demands, network services demands, or storage facilities demands.

* * * * *